(12) United States Patent
Gilger et al.

(10) Patent No.: US 10,216,359 B2
(45) Date of Patent: *Feb. 26, 2019

(54) SYSTEM FOR DISPLAYING A STATUS OF AN OBJECT OF INTEREST

(71) Applicant: Visualcue Technologies, LLC, Orlando, FL (US)

(72) Inventors: Kerry Gilger, Orlando, FL (US); Irving Bushnell, Melbourne, FL (US); Steven Slesinger, Melbourne, FL (US); Aashish Gandhi, Sayreville, NJ (US)

(73) Assignee: VISUALCUE TECHNOLOGIES, LLC, Orlando, FL (US)

( * ) Notice: Subject to any disclaimer, the term of this patent is extended or adjusted under 35 U.S.C. 154(b) by 341 days.

This patent is subject to a terminal disclaimer.

(21) Appl. No.: 14/710,044

(22) Filed: May 12, 2015

(65) Prior Publication Data

US 2015/0248214 A1 Sep. 3, 2015

Related U.S. Application Data

(63) Continuation-in-part of application No. 14/302,744, filed on Jun. 12, 2014, now Pat. No. 9,336,620, which
(Continued)

(51) Int. Cl.
*G06T 15/00* (2011.01)
*G06F 3/0481* (2013.01)
(Continued)

(52) U.S. Cl.
CPC ........ *G06F 3/04817* (2013.01); *G06F 3/0482* (2013.01); *G06F 3/04842* (2013.01);
(Continued)

(58) Field of Classification Search
CPC ............. G06F 3/04842; G06F 3/04817; G06F 3/0482; G06F 3/04847; G06Q 10/0833; G06T 11/206
(Continued)

(56) References Cited

U.S. PATENT DOCUMENTS 5,321,800 A 6/1994 Lesser
7,573,487 B1 8/2009 Peterson
(Continued)

OTHER PUBLICATIONS

Benson Jordan et al., "Poster Using Orthographic Projection and Animation to Convey Treemap Structure", 2010, pp. 1-2.

*Primary Examiner* — Phu K Nguyen
(74) *Attorney, Agent, or Firm* — Stephen C. Thomas; Courtney M. Dunn

(57) ABSTRACT

A system and method for creating a visual perspective of operational information that facilitates rapid decision making. The system and method merges existing data sources from any number of computer-fed external data sources through an applications server to display data set in easily recognizable, repeatable images (tiles) uniquely designed for a user's application. The system and method create visual perspectives of data that accelerate decision-making and problem solving processes by displaying repeatable images (tiles) that display performance results verses expected performance criteria in high-volume, intuitive displays.

63 Claims, 26 Drawing Sheets

Related U.S. Application Data is a continuation of application No. 12/205,259, filed on Sep. 5, 2008, now Pat. No. 8,767,012.

(60) Provisional application No. 60/970,827, filed on Sep. 7, 2007, provisional application No. 61/991,922, filed on May 12, 2014, provisional application No. 61/991,982, filed on May 12, 2014, provisional application No. 61/991,990, filed on May 12, 2014, provisional application No. 61/992,002, filed on May 12, 2014, provisional application No. 61/992,006, filed on May 12, 2014, provisional application No. 61/991,991, filed on May 12, 2014, provisional application No. 61/992,009, filed on May 12, 2014, provisional application No. 61/992,032, filed on May 12, 2014.

(51) Int. Cl.
*G06F 3/0484* (2013.01)
*G06F 3/0482* (2013.01)
*G06T 11/20* (2006.01)
*G06Q 10/08* (2012.01)

(52) U.S. Cl.
CPC ........ *G06F 3/04847* (2013.01); *G06T 11/206* (2013.01); *G06Q 10/0833* (2013.01)

(58) Field of Classification Search
USPC ......................................................... 345/419
See application file for complete search history.

(56) References Cited

U.S. PATENT DOCUMENTS

| | | | |
|---|---|---|---|
| 8,139,063 | B2 | 3/2012 | Helfman et al. |
| 8,254,282 | B2 | 8/2012 | Young et al. |
| 8,286,100 | B2 | 10/2012 | Helfman et al. |
| 8,444,464 | B2 | 5/2013 | Boch et al. |
| 8,504,347 | B2 | 8/2013 | Kosugi |
| 8,516,392 | B2 | 8/2013 | Ostroff |
| 8,767,012 | B2 * | 7/2014 | Gilger .................... G06Q 10/00 345/440 |
| 8,910,084 | B2 * | 12/2014 | Helfman ................ G06T 11/206 715/854 |
| 9,336,620 | B2 * | 5/2016 | Gilger .................... G06Q 10/00 |
| 9,372,592 | B1 * | 6/2016 | Goodspeed ........... G06F 3/0481 |
| 9,454,291 | B2 * | 9/2016 | Helfman ........... G06F 17/30572 |
| 9,477,732 | B2 * | 10/2016 | Helfman ........... G06F 17/30572 |
| 9,589,012 | B2 * | 3/2017 | Neels ................ G06F 17/30424 |
| 2004/0088377 | A1 | 5/2004 | Henriquez |
| 2004/0168115 | A1 | 8/2004 | Bauernschmidt et al. |
| 2005/0151737 | A1 | 7/2005 | Chiu et al. |
| 2005/0283742 | A1 | 12/2005 | Gusmorino et al. |
| 2007/0168266 | A1 | 7/2007 | Questembert |
| 2009/0002370 | A1 | 1/2009 | Helfman |
| 2009/0013287 | A1 | 1/2009 | Helfman et al. |
| 2009/0048959 | A1 | 2/2009 | Omura et al. |
| 2009/0125825 | A1 | 5/2009 | Rye et al. |
| 2011/0004830 | A1 | 1/2011 | Von Kaenel et al. |

\* cited by examiner

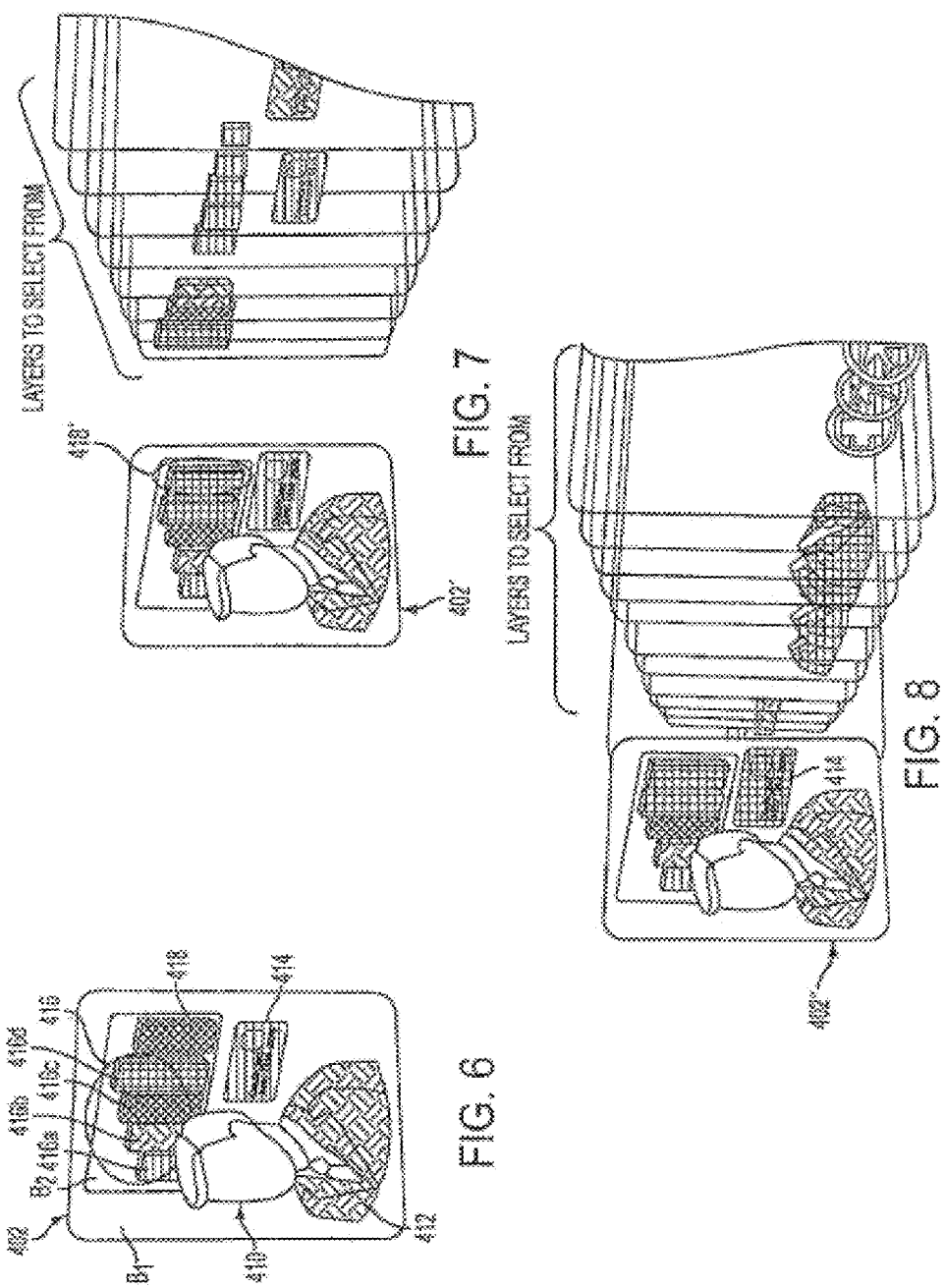

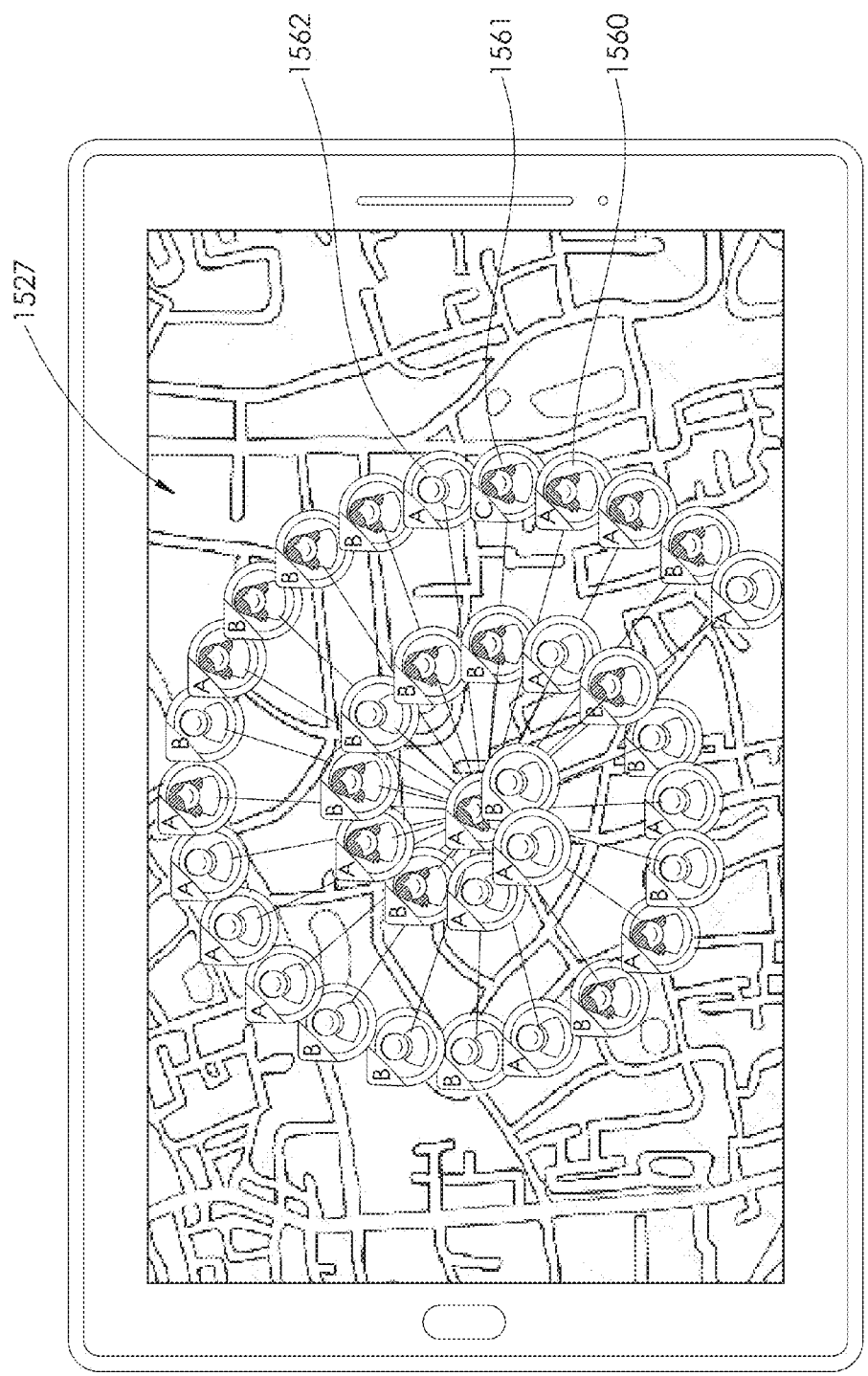

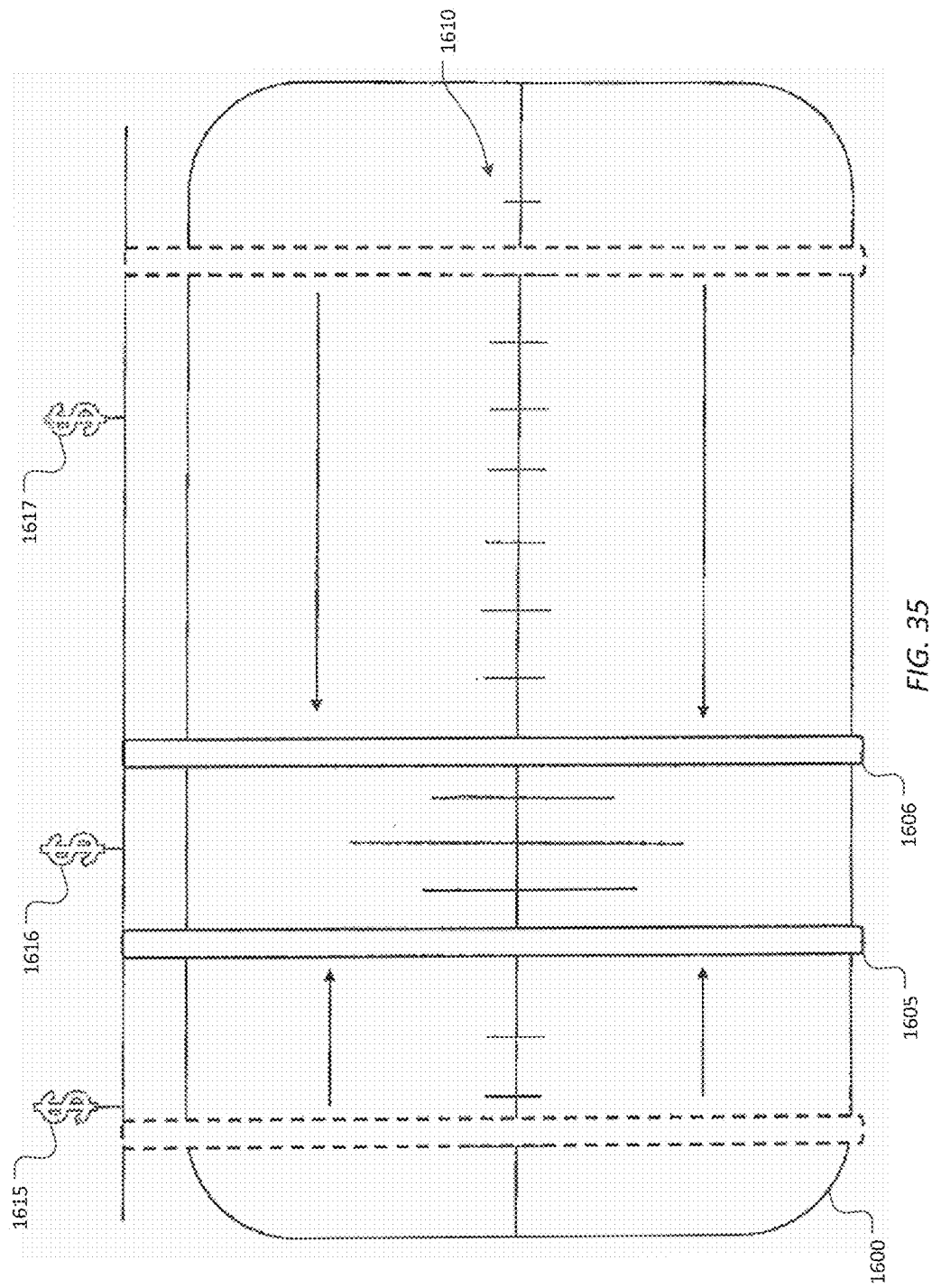

SYSTEM FOR DISPLAYING A STATUS OF AN OBJECT OF INTEREST

CROSS-REFERENCE TO RELATED APPLICATIONS

This application is a continuation-in-part of U.S. Non-Provisional application Ser. No. 14/302,744, entitled "Advanced Data Visualization Solutions in High-Volume Data Analytics", filed Jun. 12, 2014, which is a continuation of U.S. Pat. No. 8,767,012, entitled "Advanced Data Visualization in High-Volume Data Analytics", filed Sep. 5, 2008, which claim the benefit of U.S. Provisional Application No. 60/970,827, entitled "Advanced Data Visualization Solutions in High-Volume Data Analytics", filed Sep. 7, 2007, and this application claims the benefit of U.S. Provisional Application No. 61/991,922, entitled "System for Displaying a System Status Including a Video Feed and Related Methods", filed May 12, 2014, U.S. Provisional Application No. 61/991,982, entitled "System for Displaying a Status of a Process of Interest including Icons of a Display Tile and a Flow Diagram and Related Methods", filed May 12, 2014, U.S. Provisional Application No. 61/991,990, entitled "System for Displaying a System Status Based Upon a Geographic Position and Related Methods", filed May 12, 2014, U.S. Provisional Application No. 61/992,002, entitled "System for Displaying a System Status Based Upon a Timestamp and Related Methods", filed May 12, 2014, U.S. Provisional Application No. 61/992,006, entitled System for Displaying a System Status Including a Calendar and Related Methods", filed May 12, 2014, U.S. Provisional Application No. 61/991,991, entitled "System for Displaying a System Status Including Display Tiles in a Stacked Overlapping Relation and Related Methods", filed May 12, 2014, U.S. Provisional Application No. 61/992,009, entitled "System for Displaying a System Status Including Display Tiles and Related Methods", filed May 12, 2014, and U.S. Provisional Application No. 61/992,032, entitled "System for Displaying a System Status Including Icon Display Characteristics Based Upon a Threshold and Related Methods" filed May 12, 2014, which are all hereby incorporated by reference in their entireties.

FIELD OF THE INVENTION

The present invention relates to the field of data processing, and, more particularly, to displaying data and related methods.

BACKGROUND OF THE INVENTION

Due to the Internet and wireless technology, data has never been more plentiful and available. Transactional applications such as ERP (enterprise resource planning), SCM (supply chain management), CRM (customer relationship management) and enterprise project management have matured and now gather large volumes of information about internal and external business processes. The gathering and use of unstructured data has also increased from the widespread use of web sites, email, knowledge management, XML (extensible markup language) and enterprise storage systems and will continue to do so as future applications are developed.

Unfortunately, having access to data is not the same as effectively using it. Users with the opportunity to analyze more data are often overwhelmed and frustrated by the amount of effort required to make sense of it all. Most organizations today use tools that were developed when networks, and processors were slow, disk space was expensive and databases were unable to handle complex queries. These tools failed to present information clearly to business users when there were multiple dimensions of data to integrate into a decision.

Data in high-level summaries, such as simple dashboards, is presented in a rigid fashion and does not provide explanations of "why" results are as they appear. The drill-downs to detailed reports and associated search tools generate simple row and column views that have become long lists with text or numbers displayed out of context. More often than not, workers are unable to find answers to their questions through these systems alone. Because business people typically do not have a way to access and explore their data themselves, they usually end up either operating without the information or creating their own ad-hoc desktop solution.

Traditionally, business intelligence tools have attempted to accomplish this through end-user dashboards that link static reports and expose development tools. But simple dashboard gauges fail to capture complex business problems. At the same time, the number of columns and rows in static reports has grown well beyond end users' ability to quickly get meaning from the data. And, both dashboards and static reports fail to consider more than a few dimensions of data-thus failing to provide a true representation of today's more sophisticated business environments. Moreover, while graphical elements such as line and pie charts might be included in a static report, they display data in only one or two dimensions and cannot show relationships with data in other reports, which is undesirable.

The complexity of businesses has out-paced today's decision-making tools. As a result, organizations are struggling to make use of the volumes of information available to them. Workers spend too much time creating reports manually, and the growing list of custom reporting requests is overwhelming information technology (IT) staff. Moreover, the traditional approaches for generating reports and dashboards may need to be extended to help users answer the complex questions that affect corporate performance. New solutions may be desired to keep pace with growing business complexity. It is not easy to create a self-service interface in which business users can intuitively explore and understand high volumes of data.

One attempt to address the above-noted problems is disclosed in U.S. Pat. No. 5,321,800. The '800 patent discloses an information presentation method for a subject being monitored. In the only illustrated embodiment, display segments of fixed size, shape and location are used to map out a human body (the subject) being analyzed by a physician or lab technician. Each portion of the body being monitored is associated with a datapoint. Rectangular-shaped icons are placed in the pre-defined segments in the human body display to show the status of the datapoint. The icons can have one of a plurality of colors. In addition, effects, such as changing the intensity of an icon's color, flashing/modulating the icon, and/or placing a different color in the center portion of an icon can also be used to provide status information.

The technique disclosed in the '800 patent, however, may be unsatisfactory for real time repetitive data analysis, particularly when there are numerous datapoints or subjects to monitor. For example, the technique is tied to the use of rectangular icons for conveying status information of every datapoint being evaluated. Because each icon has the same shape, the icons are placed in specific locations to represent the datapoint of interest; this forces the observer to remember numerous datapoint-to-location correlations for a single subject (e.g., as shown in FIG. 3 of the '800 patent, the head portion alone contains 18 different datapoint locations). Moreover, if images for multiple subjects are displayed at the same time, it may be difficult to quickly determine the status of a particular datapoint or datapoints.

Accordingly, there is a need and desire for a technique that creates a suitable visual perspective of high volume, repetitive data that allows an observer to quickly determine the status of a particular subject (i.e., person, thing, business) being monitored even when multiple subjects are being monitored at the same time.

SUMMARY OF THE INVENTION

In accordance with the teaching disclosed herein, embodiments related to a system for displaying a status of an object of interest are disclosed.

In an embodiment, a method of displaying a status of an object of interest comprises receiving a video feed including an object of interest and receiving data related to a plurality of status attributes for the object of interest. Each status attribute has an icon associated with it that conveys meaning through a pictorial resemblance of the object of interest. An icon display characteristic is determined for each icon based on the received data. The icon display characteristic is also indicative of a value of the associated status attribute. A display tile is generated for the object of interest by combining the icons. In the display tile, at least a portion of each icon with its icon display characteristic remains visible. A combined video feed is created by combining the video feed and the display tile. The combined video feed is representative of the status of the object of interest. The combined video feed is displayed on a display.

In another embodiment, a method of displaying a status of an object of interest comprises receiving a video feed including an object of interest and receiving data related to a plurality of status attributes for the object of interest. Each status attribute has an icon associated with it that conveys meaning through a pictorial resemblance of the object of interest. An icon display characteristic is determined for each icon based on the received data. The icon display characteristic is also indicative of a value of the associated status attribute. A plurality of virtual image layers is generated. Each virtual image layer is associated with a respective determined icon display characteristic. A display tile is generated for the object of interest by combining the plurality of virtual image layers. A combined video feed is created by combining the video feed and the display tile. The combined video feed is representative of the status of the object of interest. The combined video feed is displayed on a display.

In yet another embodiment, a system for displaying a status of an object of interest comprises a processor in electrical communication with a memory. The memory comprises computer readable non-transitory memory that comprises computer readable instructions for execution by the processor. The computer readable instructions cause the system to perform a plurality of operations comprising receiving a video feed including an object of interest and receiving data related to a plurality of status attributes for the object of interest. Each status attribute has an icon associated with it that conveys meaning through a pictorial resemblance of the object of interest. The operations also comprise determining an icon display characteristic for each icon based on the received data. The icon display characteristic is also indicative of a value of the associated status attribute.

The operations further comprise generating a display tile for the object of interest by combining the icons. In the display tile, at least a portion of each icon with its icon display characteristic remains visible. The operations yet further comprise combining the video feed and the display tile into a combined video feed that is representative of the status of the object of interest and displaying the combined video feed on a display.

In a further embodiment, a system for displaying a status of an object of interest comprises an electronic device having a display, a camera, and a processor in electrical communication with a memory. The memory comprises computer readable non-transitory memory that comprises computer readable instructions for execution by the processor. The computer readable instructions cause the system to perform a plurality of operations comprising receiving a video feed from the camera including an object of interest and receiving data related to a plurality of status attributes for the object of interest. Each status attribute has an icon associated with it that conveys meaning through a pictorial resemblance of the object of interest. The operations also comprise determining an icon display characteristic for each icon based on the received data. The icon display characteristic is also indicative of a value of the associated status attribute. The operations further comprise generating a display tile for the object of interest by combining the icons. In the display tile, at least a portion of each icon with its icon display characteristic remains visible. The operations yet further comprise combining the video feed and the display tile into a combined video feed that is representative of the status of the object of interest and displaying the combined video feed on the display.

In a yet further embodiment, a system for displaying a status of an object of interest comprises a server having a processor in electric communication with a memory comprising computer readable non-transitory memory comprising computer readable instructions for execution by the processor, a camera in communication with the server, and a display in communication with the server. The computer readable instructions cause the system to perform a plurality of operations comprising receiving a video feed from the camera including an object of interest and receiving data related to a plurality of status attributes for the object of interest. Each status attribute has an icon associated with it that conveys meaning through a pictorial resemblance of the object of interest. The operations also comprise determining an icon display characteristic for each icon based on the received data. The icon display characteristic is also indicative of a value of the associated status attribute. The operations further comprise generating a display tile for the object of interest by combining the icons. In the display tile, at least a portion of each icon with its icon display characteristic remains visible. The operations yet further comprise combining the video feed and the display tile into a combined video feed that is representative of the status of the object of interest and displaying the combined video feed on the display.

In an embodiment, a method of displaying a status of an object of interest comprises receiving data related to a plurality of status attributes for the object of interest. Each status attribute has an icon associated with it that conveys meaning through a pictorial resemblance of the object of interest. An icon display characteristic is determined for each icon based on the received data. The icon display characteristic is also indicative of a value of the associated status attribute. A display tile is generated for the object of interest by combining the icons. In the display tile, at least a portion of each icon with its icon display characteristic remains visible. The display tile is displayed on a display and a user selection of one of the icons is received. A secondary display tile is generated based upon the icon that was selected by the user by combining a plurality of secondary icons associated with the status attributes of the user-selected icon. The secondary display tile is then displayed on the display.

In another embodiment, a system for displaying a status of an object of interest comprises a processor in electrical communication with a memory. The memory comprises computer readable non-transitory memory that comprises computer readable instructions for execution by the processor. The computer readable instructions cause the system to perform a plurality of operations comprising receiving data related to a plurality of status attributes for the object of interest. Each status attribute has an icon associated with it that conveys meaning through a pictorial resemblance of the object of interest. The operations also comprise determining an icon display characteristic for each icon based on the received data. The icon display characteristic is also indicative of a value of the associated status attribute. The operations further comprise generating a display tile for the object of interest by combining the icons. In the display tile, at least a portion of each icon with its icon display characteristic remains visible. The operation yet further comprise displaying the display tile on a display, receiving a user selection of one of the icons, generating a secondary display tile based upon the user-selected icon by combining a plurality of secondary icons associated with the status attribute of the user-selected icon, and displaying the secondary display tile on the display.

In yet another embodiment, a method of displaying a status of an object of interest comprises receiving a position of an object of interest and receiving data related to a plurality of status attributes for the object of interest. Each status attribute has an icon associated with it that conveys meaning through a pictorial resemblance of the object of interest. An icon display characteristic is determined for each icon based on the received data. The icon display characteristic is also indicative of a value of the associated status attribute. A display tile is generated for the object of interest by combining the icons. In the display tile, at least a portion of each icon with its icon display characteristic remains visible. The display tile and a geographic depiction of an area comprising the position are combined and the display tile is positioned on the geographic depiction at a location representative of the position. The combined display tile and geographic depiction is displayed on a display.

In a further embodiment, a system for displaying a status of an object of interest comprises a processor in electrical communication with a memory. The memory comprises computer readable non-transitory memory that comprises computer readable instructions for execution by the processor. The computer readable instructions cause the system to perform a plurality of operations comprising receiving a position of an object of interest and receiving data related to a plurality of status attributes for the object of interest. Each status attribute has an icon associated with it that conveys meaning through a pictorial resemblance of the object of interest. The operations also comprise determining an icon display characteristic for each icon based on the received data. The icon display characteristic is also indicative of a value of the associated status attribute. The operations further comprise generating a display tile for the object of interest by combining the icons. In the display tile, at least a portion of each icon with its icon display characteristic remains visible. The operations yet further comprise combining the display tile and a geographic depiction of an area comprising the position, wherein the display tile is positioned on the geographic depiction at a location representative of the position, and displaying the combined display tile and geographic depiction on a display.

In a yet further embodiment, a method of displaying a status of an object of interest receiving data related to a plurality of status attributes for the object of interest. Each status attribute has an icon associated with it that conveys meaning through a pictorial resemblance of the object of interest. An icon display characteristic is determined for each icon based on the received data. The icon display characteristic is also indicative of a value of the associated status attribute. A display tile is generated for the object of interest by combining the icons. In the display tile, at least a portion of each icon with its icon display characteristic remains visible. The display tile has a timestamp associated with it. A timeline mosaic is generated that comprises a timeline that comprises the time reflected in the timestamp and the display tile. The display tile is positioned along the timeline at a location representative of the time reflected in the timestamp. The timeline mosaic is then displayed on a display.

In another embodiment, a system for displaying a status of an object of interest comprises a processor in electrical communication with a memory. The memory comprises computer readable non-transitory memory that comprises computer readable instructions for execution by the processor. The computer readable instructions cause the system to perform a plurality of operations comprising receiving data related to a plurality of status attributes for the object of interest. Each status attribute has an icon associated with it that conveys meaning through a pictorial resemblance of the object of interest. The operations also comprise determining an icon display characteristic for each icon based on the received data. The icon display characteristic is also indicative of a value of the associated status attribute. The operations further comprise generating a display tile for the object of interest by combining the icons. In the display tile, at least a portion of each icon with its icon display characteristic remains visible. The display tile has a timestamp associated with it. The operations yet further comprise generating a timeline mosaic comprising a timeline comprising the time reflected in the timestamp and the display tile, wherein the display tile is positioned along the timeline at a location representative of the time reflected in the timestamp, and displaying the timeline mosaic on a display.

In a yet another embodiment, a method of displaying a status of an object of interest comprises receiving data related to a plurality of status attributes for the object of interest. Each status attribute has an icon associated with it that conveys meaning through a pictorial resemblance of the object of interest. An icon display characteristic is determined for each icon based on the received data. The icon display characteristic is also indicative of a value of the associated status attribute. A display tile is generated for the object of interest by combining the icons. In the display tile, at least a portion of each icon with its icon display characteristic remains visible. The display tile has a date associated with it. A calendar mosaic is generated that comprises a calendar that comprises the date and the display tile. The display tile is positioned on the calendar at a location corresponding to the date. The timeline mosaic is then displayed on a display.

In a further embodiment, a system for displaying a status of an object of interest comprises a processor in electrical communication with a memory. The memory comprises computer readable non-transitory memory that comprises computer readable instructions for execution by the processor. The computer readable instructions cause the system to perform a plurality of operations comprising receiving data related to a plurality of status attributes for the object of interest. Each status attribute has an icon associated with it that conveys meaning through a pictorial resemblance of the object of interest. The operations also comprise determining an icon display characteristic for each icon based on the received data. The icon display characteristic is also indicative of a value of the associated status attribute. The operations further comprise generating a display tile for the object of interest by combining the icons. In the display tile, at least a portion of each icon with its icon display characteristic remains visible. The display tile has a date associated with it. The operations yet further comprise generating a calendar mosaic comprising a calendar comprising the date and the display tile, wherein the display tile is positioned on the calendar at a location corresponding to the date, and displaying the calendar mosaic on a display.

In a yet further embodiment, a method of displaying a status of a process of interest comprises receiving data related to a plurality of status attributes for the process of interest. Each status attribute has an icon associated with it that conveys meaning through a pictorial resemblance of the process of interest. An icon display characteristic is determined for each icon based on the received data. The icon display characteristic is also indicative of a value of the associated status attribute. A process display tile is generated for the object of interest by combining the icons. In the process display tile, at least a portion of each icon with its icon display characteristic remains visible. The process display tile is then displayed on a display.

In another embodiment, a system for displaying a status of an process of interest comprises a processor in electrical communication with a memory. The memory comprises computer readable non-transitory memory that comprises computer readable instructions for execution by the processor. The computer readable instructions cause the system to perform a plurality of operations comprising receiving data related to a plurality of status attributes for the process of interest. Each status attribute has an icon associated with it that conveys meaning through a pictorial resemblance of the object of interest. The operations also comprise determining an icon display characteristic for each icon based on the received data. The icon display characteristic is also indicative of a value of the associated status attribute. The operations further comprise generating a process display tile for the object of interest by combining the icons. In the process display tile, at least a portion of each icon with its icon display characteristic remains visible. The operations yet further comprise displaying the process display tile on a display.

In a yet another embodiment, a method of displaying a system status for a plurality of objects of interest comprises receiving data related to a plurality of status attributes for each of a plurality of objects of interest. Each status attribute has an icon associated with it that conveys meaning through a pictorial resemblance of the object of interest. An icon display characteristic is determined for each icon based on the received data. The icon display characteristic is also indicative of a value of the associated status attribute. A respective display tile is generated for each object of interest by combining the icons. In the display tile, at least a portion of each icon with its icon display characteristic remains visible. The display tile are then combined in overlapping and stacked relation and the combined display tiles are displayed on the display.

In a further embodiment, a system for displaying a system status for a plurality of objects of interest comprises a processor in electrical communication with a memory. The memory comprises computer readable non-transitory memory that comprises computer readable instructions for execution by the processor. The computer readable instructions cause the system to perform a plurality of operations comprising receiving data related to a plurality of status attributes for each of the plurality of objects of interest. Each status attribute has an icon associated with it that conveys meaning through a pictorial resemblance of the object of interest. The operations also comprise determining an icon display characteristic for each icon based on the received data. The icon display characteristic is also indicative of a value of the associated status attribute. The operations further comprise generating a display tile for each object of interest by combining the icons. In the display tile, at least a portion of each icon with its icon display characteristic remains visible. The operations yet further comprise combining the display tiles in overlapping and stacked relation, and then displaying the combined display tiles on a display.

In a yet further embodiment, a method of displaying a system status for a plurality of objects of interest comprises receiving data related to a plurality of status attributes for each of a plurality of objects of interest. Each status attribute has an icon associated with it that conveys meaning through a pictorial resemblance of the object of interest. An icon display characteristic is determined for each icon based on the received data. The icon display characteristic is also indicative of a value of the associated status attribute. A respective display tile is generated for each object of interest by combining the icons. In the display tile, at least a portion of each icon with its icon display characteristic remains visible. The display tile are then combined and a composite indicate that represents the combined display tiles is generated. The composite indicator is then displayed on the display.

In another embodiment, a system for displaying a system status for a plurality of objects of interest comprises a processor in electrical communication with a memory. The memory comprises computer readable non-transitory memory that comprises computer readable instructions for execution by the processor. The computer readable instructions cause the system to perform a plurality of operations comprising receiving data related to a plurality of status attributes for each of the plurality of objects of interest. Each status attribute has an icon associated with it that conveys meaning through a pictorial resemblance of the object of interest. The operations also comprise determining an icon display characteristic for each icon based on the received data. The icon display characteristic is also indicative of a value of the associated status attribute. The operations further comprise generating a display tile for each object of interest by combining the icons. In the display tile, at least a portion of each icon with its icon display characteristic remains visible. The operations yet further comprise combining the display tiles, generating a composite indicator representing the combined display tiles, and then displaying the composite indicator on a display.

In yet another embodiment, a method of displaying a status of an object of interest comprises receiving data related to a plurality of status attributes for the object of interest. Each status attribute has an icon associated with it that conveys meaning through a pictorial resemblance of the object of interest. An icon display characteristic is determined for each icon based on the received data. The icon display characteristic is also indicative of a value of the associated status attribute. A diagram of the distribution of the set of data for the status attributes is generated and the diagram is combined with at least one slideable manipulation slider. The combined diagram and at least one slideable manipulation slider are then displayed on a display. Input from the user is received that comprises the placement of the manipulation slider in relation to the diagram. A threshold for a first and a second icon display characteristic for the icon is determined based on the placement of the manipulation slider. Additional data related to the status attribute is received and then at least a portion of the icon is displayed on the display, wherein the first icon display characteristic is visible on the icon when the additional data is below the threshold and the second icon display characteristic is visible on the icon when the additional data is above the threshold.

In a further embodiment, a system for displaying a status of an object of interest comprises a processor in electrical communication with a memory. The memory comprises computer readable non-transitory memory that comprises computer readable instructions for execution by the processor. The computer readable instructions cause the system to perform a plurality of operations comprising receiving data related to a plurality of status attributes for each of the plurality of objects of interest. Each status attribute has an icon associated with it that conveys meaning through a pictorial resemblance of the object of interest. The operations also comprise generating a diagram of the distribution of the set of data for the status attributes, combining the diagram and at least one slideable manipulation slider, and displaying the combined diagram and the at least one slideable manipulation slider. The operations further comprise receiving input from a user comprising the placement of the manipulation slider in relation to the diagram, and determining a threshold for a first icon display characteristic and a second icon display characteristic for the icon based upon the placement of the manipulation slider. The operations yet further comprise receiving additional data related to the status attribute, and displaying at least a portion of the icon on the display, wherein the first icon display characteristic is visible on the icon when the additional data is below the threshold and the second icon display characteristic is visible on the icon when the additional data is above the threshold.

BRIEF DESCRIPTION OF THE DRAWINGS

FIG. 6 illustrates an example tile from the FIG. 5 mosaic display.

FIG. 7 illustrates a modified version of the FIG. 6 title using layering in accordance with an embodiment of the invention.

FIG. 8 illustrates a modified version of the FIG. 7 title using layering in accordance with an embodiment of the invention.

FIG. 34B is a diagram of the display of a mobile device displaying a map having a plurality of display tiles that comprise an expanded composite display tile according to an embodiment of the present invention.

FIG. 35 is a diagram of a display illustrating adjustable thresholds for icon display characteristics in accordance with the present invention.

DETAILED DESCRIPTION OF THE PREFERRED EMBODIMENTS

Figure 1:
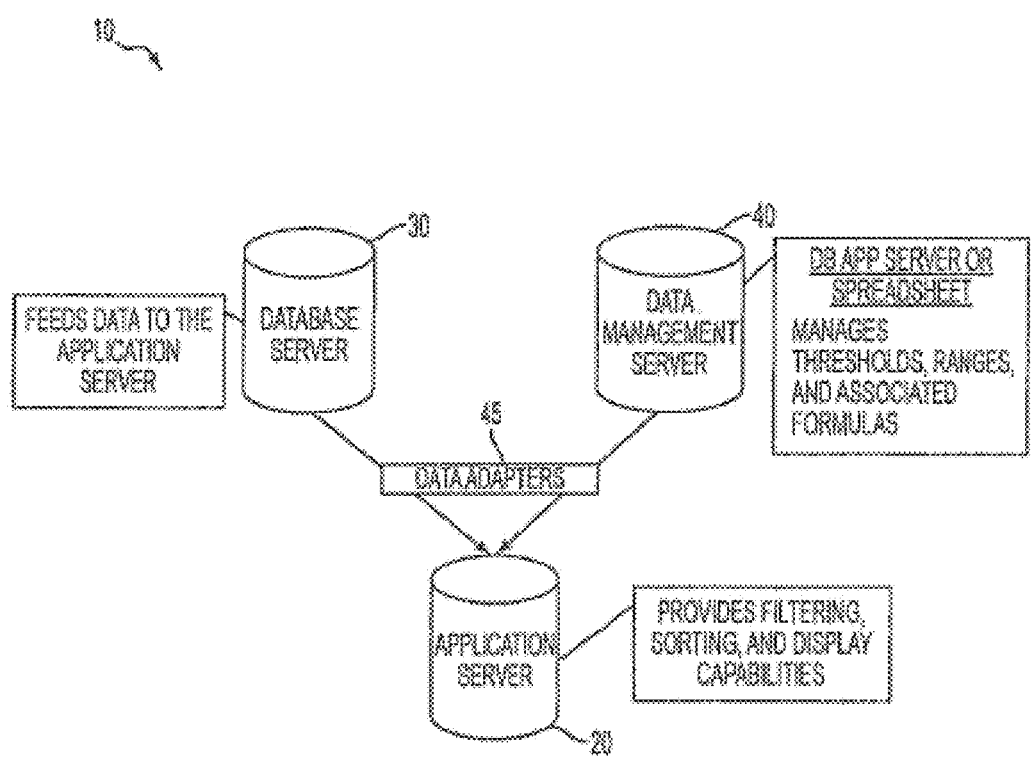
FIG. 1 illustrates a block diagram of an example system according to an embodiment of the invention.

Example embodiments and applications will now be described. Other embodiments may be realized and structural or logical changes may be made to the disclosed embodiments. Although the embodiments disclosed herein have been particularly described as applied to a business or office environment, it should be readily apparent that the embodiments may be embodied for any use or application having the same or similar problems.

Embodiments disclosed herein relate to a system for creating, and outputting to a user device, a visual perspective of operational information that facilitates rapid decision making by a user/observer of the system. Embodiments disclosed herein create visual displays of high volume, repetitive data generated from multiple operational sources. Display tiles, formed using individual layers of images that represent individual attributes being monitored, make up an overall mosaic display that provides a picture of the status of an entire system. Each tile in the display provides information about one discrete component (e.g., employee, seaport, cargo container) within the system being monitored. Each tile contains a plurality of image layers. Each layer includes an image associated with an attribute being monitored. Each layer is linked to a value, threshold, or range of values so that a current state of that attribute is displayed within the tile. The images from the active layers create the unified image of the tile.

Unlike other systems, the image layers are designed to represent the attribute associated with that layer so that the attribute is easily recognizable from the image itself. The images of each layer are chosen to be easily recognizable as (or associated with) the attribute being monitored. In disclosed embodiments, there can be multiple layers that may have the same image, but different color to represent a different status of the attribute. For example, dark blue may indicate a status that is severely below what is expected; light blue may indicate a status that is slightly below what is expected; green may indicate a status that the attribute (e.g., sales by a salesperson) is meeting expected performance; orange may indicate a status that is slightly above what is expected; and gold may indicate a status that greatly exceeds expectation. However, the ability to distinguish various states of an attribute is not limited to colors, but can also be extended by using different images. For example, an image of a man or a woman can indicate the gender of the salesperson. Another way to distinguish the state of an attribute is by having images of different sizes. For example, the size of the bars in a bar graph may vary to further indicate the status of the attribute being monitored.

In operation, when input data dictates that an attribute has a changed status, a new layer containing the appropriate image is brought to the top of the other layers, which supplants the prior image of that attribute, but does not change the images of other elements/attributes being displayed using the other layers. The changing mosaic allows observers to quickly and accurately make the decisions required to maintain the appropriate operational level for the entire system and rapidly pinpoint areas that need to be addressed.

FIG. 1 illustrates a block diagram of an example system 10 constructed in accordance with an embodiment of the invention. The system 10 comprises an application server 20, database server 30 and data management server 40. The application server 20 is connected to the database server 30 and the data management server 40 via data adapters 45.

The application server 20 accepts inputs through a data adapter 45 with links to the original data repository/data source and to the management server 40. The management server 40 may comprise spreadsheets, database tables, data streams and/or reports. The application server 20 links the input to a set of image layers that are being used to represent attributes being monitored. The application server 20: (1) monitors the ranges or discrete values of the data associated with the attributes that are associated with each image layer; (2) feeds the display with the properly compiled image layers to produce a unified display tile; and (3) provides sorting and filtering capabilities according to the values and the proper association to the tiles.

The database server 30 serves as a data source that provides data to the application server 20 (through a data adapter 45). The data can be collected from any of numerous sources, and it should be appreciated that how the data is collected is not important as long as the relevant data is collected. For example, sales data from different regions can be obtained in different formats. For example, sales data from North America is available from a Microsoft SQL Server database, data from Europe is obtained from an Excel spreadsheet, and data from Far East Asia in kanji and katakana Japanese scripts is provided in a text file. A data adapter 45 can collect data from these different sources, run the translation if necessary and present the data to the application server 20. The data management server 40 provides a vehicle to easily set up parameters for the ranges and thresholds used by the application server 20. It should be appreciated that the servers 30, 40 may be connected to a variety of data sources, to produce similar results discussed herein, as long as the application server 20 is programmed to manage the resultant displays, perform the necessary value monitoring, and perform the resultant technical management of image layer/input data value correlation. It should also be appreciated that in some applications, a data management server 40 may not be required since the application server 20 may be programmed to handle the functions of the data management server 40. Moreover, it should also be appreciated that a single server computer can implement the functionality of the application server 20, data management server 40 and database server 30, if desired and system requirements allow.

Although not shown in FIG. 1, a user interface/display mechanism (e.g., an Internet browser, PDA, web enabled device) in communication with the application server 20 is used to display the operational status of the monitored system using multiple tiles arranged according to user definable desired patterns. Example mosaic displays and tiles are discussed below with reference to FIGS. 3, and 5-20. The concept of layering is also discussed below with reference to FIGS. 4a and 4b.

Figure 2:
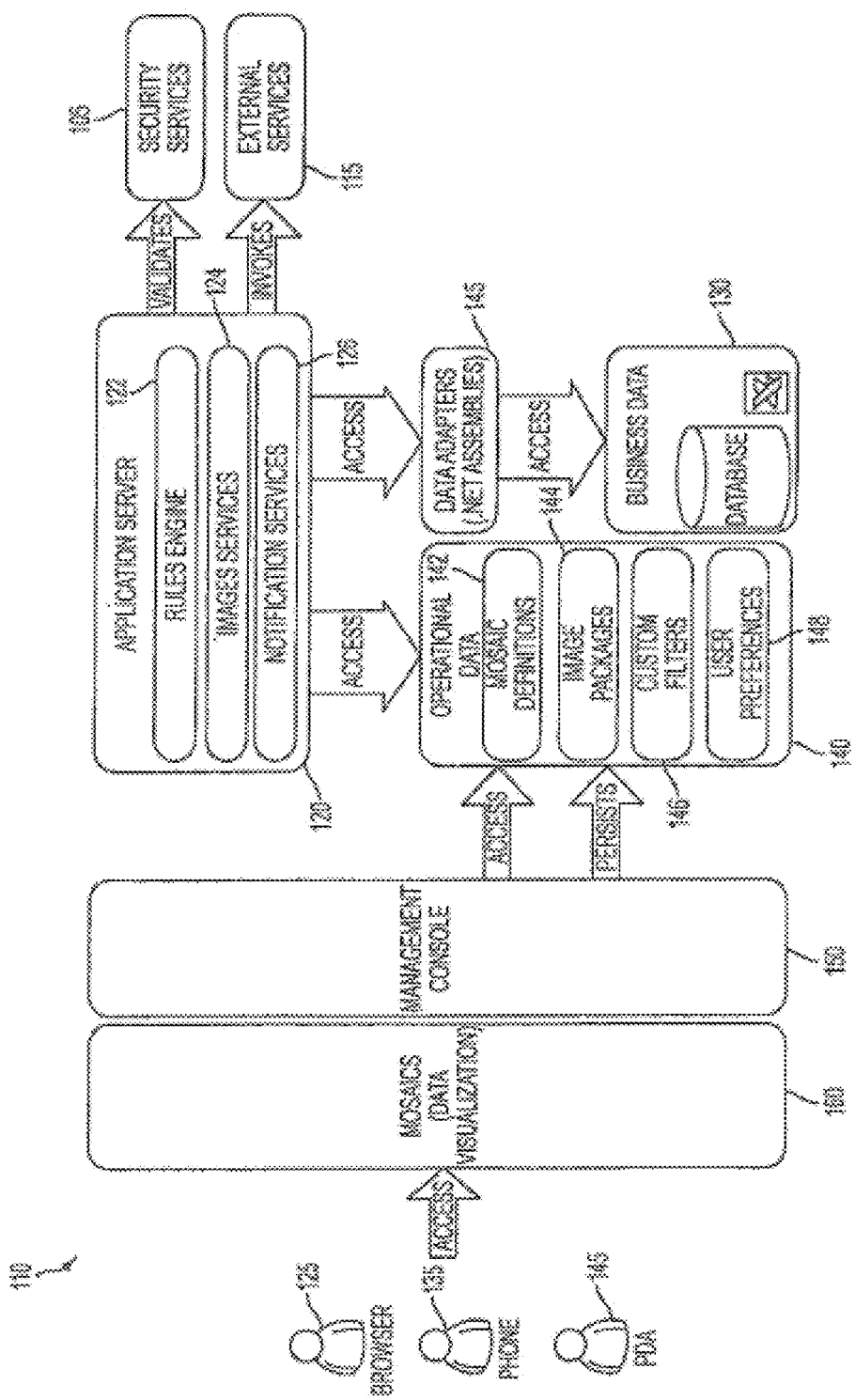
FIG. 2 illustrates a block diagram of another example system constructed in accordance with an embodiment of the invention.

FIG. 2 illustrates a block diagram of another example system 110 constructed in accordance with an embodiment of the invention. The system 110 comprises an application server 120, database server 130, and data management server 140. The application server 120 is shown accessing security services 105 and external services 115, the data management server 140 and the database server 130 (via data adapters 145). User interface devices such as an Internet browser 125, Internet enabled telephone 135 and PDA (personal digital assistant) 145 can access a mosaic display 160 output from the system 100. A management console 150 is shown having access to the data management server 140.

The application server 120 delivers a client application to the user/observer's devices 125, 135, 145 or computer (not shown) typically over the Internet and using the hypertext transfer protocol (HTTP) or by any known mechanism. The application server 120 handles the business logic required for the application by encapsulating a rules engine 122 and an image services function 124. The application server 120 may optionally notify or invoke external services using a notification service function 126. The application server 120 handles data accesses through the data adapters 145. As is described in more detail below, the application server 120 is responsible for generating the mosaic display 160 such that users/observers can determine the status of the monitored system in a manner that is currently unavailable in prior art systems.

In a preferred embodiment, the data adapters 145 are Microsoft "NET" assemblies (although not limited to the platform or programming language) that provide for Extracting, Transforming, and Loading (ETL) of business data as is known in the art. The extract stage, generally reads data from the database server 130; however, a data adapter 145 can extract data from different source systems that may use different data organization formats. Data adapters 145, during the transform stage, may optionally apply a series of rules or functions prior to or after the data is extracted to derive data that meets the business and the technical needs of validating, cleansing, and/or manipulating of the data. The load phase loads the data into the application server 120.

The management console 150 provides access and persists various resources such as mosaic definitions 142, image packages 144, user defined filters 146, and user preferences 148, collectively referred to as "operation data" and stored in the data management server 140. The mosaic display 160 is the data visualization component of the system 110. After the relevant business data is processed by the rules engine 122, the image services function 124 renders the data as display tiles (discussed below in more detail). The mosaic display application 160 displays the tiles, allowing the end user to sort through and filter the visual data (referred to herein as "visual data-mining"). It should be appreciated that a single server computer can implement the functionality of the application server 120, data management server 140 and database server 130, if desired and system requirements allow.

Figure 3:
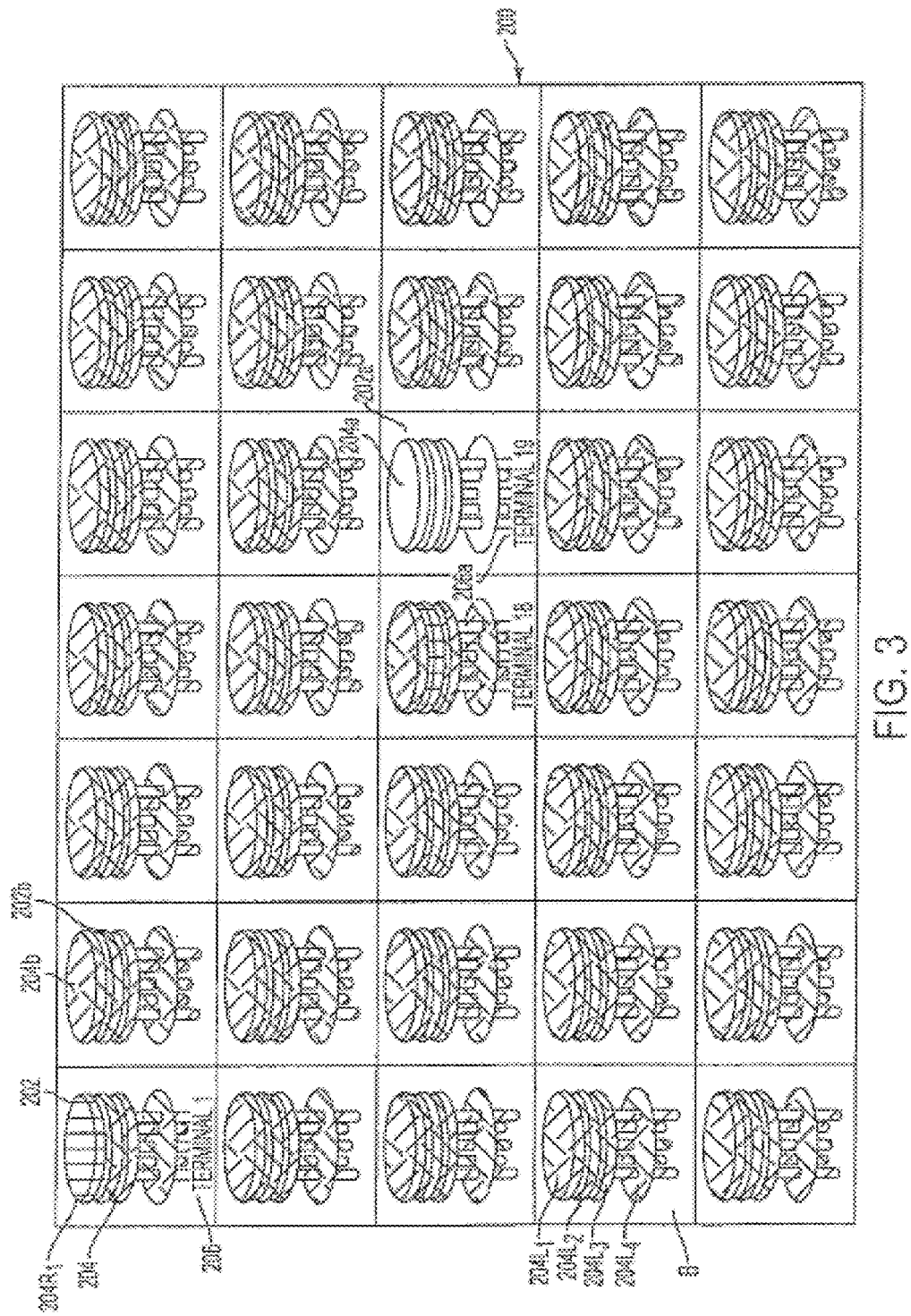
FIG. 3 illustrates an example mosaic display output from a system constructed in accordance with an embodiment of the invention.

FIG. 3 illustrates an example mosaic display 200 output from a system constructed in accordance with an embodiment of the invention (e.g., systems 10 or 110). The display 200 comprises a plurality of display tiles 202 shown in an array of rows and columns, each tile 202 comprising an object 204 or objects being monitored by the system. Optionally, text labels 206 can be included within, or adjacent to, a tile 202 to provide additional information about the tile 202 or its object 204. In the illustrated embodiment, the label 206 associates display tile 202 and object 204 with "Terminal 1" while another label 206a associates tile 206a and object 204a with "Terminal 19". Other tiles e.g., tile 202b and its associated object 204b are not associated with a label.

As mentioned above, each display tile is made up of images from a plurality of image layers, each layer corresponding to an attribute being monitored. For example, in FIG. 3, each tile 206 represents a seaport. The image layers within a seaport tile 206 represent the status of specific attributes of the seaport. For example, each tile 206 has an object 204 comprising a layer 204L1 having an image of a first portion of the seaport object 204 that is associated with the communications status of the seaport; each tile 206 has a layer 204L2 having an image of a second portion of the seaport object 204 that is associated with the electrical status of the seaport; each tile 206 has a layer 204L3 having an image of a third portion of the seaport object 204 that is associated with the mechanical status of the seaport; and each tile 206 has a layer 204L4 having an image of a fourth portion of the seaport object 204 that is associated with the mooring status of the seaport. A background B, although not required, is used in the illustrated embodiment to fulfill the tile 202. Combined, the layers 204L1, 204L1, 204L1, 204L1, comprise the object 204 of an individual tile 202.

Each layer has an image associated with a specific attribute being monitored. According to a preferred embodiment, there are multiple layers having the same image, but each layer contains an image that is varied by color or other design to represent a potential status of that attribute. For example, a gray version of the image on a layer (e.g., object 204a having all gray layers illustrated) may represent no information, a red version (e.g., object 204 in tile 202 has a red layer 204R1 while the remaining layers are green) may represent a state requiring that law enforcement be notified, and a green version (e.g., object 204b of tile 206b) may represent a normal status. It should be appreciated that the color/status correlations described herein are examples. When the selected image layers for the seaport are combined, the unified image layers complete the object 204 inside the tile 202. Repeatable tiles 202 in a display showing e.g., ports across the country, complete the mosaic display 200 giving an accurate representation of the entire system. The changing mosaic display 200 allows observers to quickly and accurately make the decisions required to maintain the appropriate operational level for the entire system and rapidly pinpoint areas that need to be addressed.

It should be appreciated that the embodiments are not limited to the illustrated seaport example. The principles disclosed herein can be used for any type of business, medical, military, social, etc. activity that needs to examine repeatable datasets that have a frequency of change. Another detailed example is described below with reference to FIGS. 5-10.

The embodiments employ a data feed from existing data sources (from databases, sensors, etc) and provide a layered representation of the relevant data. Each layer is linked to a value, threshold, or range of values so that a current state of that attribute is displayed in a unified representation in a repeatable display tile. Tiles have additional capabilities of showing labels, values, photographs, clipart, symbols, words, and/or additional color variations, and tile perimeter handles that allow for a drill down to the values being displayed, or when multiple tiles are selected to show comparisons between the selected tiles.

The FIG. 3 example is suitable for a system that would display the operational status of many seaports around the country. Although not illustrated in FIG. 3, the status of each seaport may also comprise monitoring shipping delays, utility status, container content sensors, seaport alerts, and passengers on watch lists who have or are being checked in. Each of these attributes may have a variety of levels indicating normalcy, below expectations or even heightened alert. Thus, the embodiments disclosed herein should not be limited to the illustrated examples. The applications server 120 (FIG. 2) connects to the data sources and inputs data for each of the attributes required to monitor the current state-of-health/operational status of the seaport and then feed the display 160 (FIG. 2) showing that state-of-health/operational status. The unique nature of the display includes a composite image representing the seaport. That composite image could look similar to a seaport terminal with different, distinct parts of the terminal image representing an item such as "container content sensor" (see e.g., FIG. 18 discussed below). One of the multiple layers representing the different potential states of "container content sensor" can be triggered to become visible through the centrally fed applications server 120. These triggers could be discrete numbers or states or even a range of numbers.

The resultant seaport pictogram shows a unified display depicting the state-of-health/operational status of that seaport. If there were hundreds of seaports, the repeatable image would show a display that indicates the state-of-health/operational status of all of them on a single screen (e.g., FIG. 3 illustrates 35 seaport tiles). Because the images on the layers that are different in individual tiles are distinguishable from other image layers of other tiles, they stand out even in a display containing hundreds of seaports. An agent who is monitoring the seaports can then click on the seaport tile of interest and rapidly determine the reasons for the different statuses. A screen showing multiple seaports could be sorted to show which seaports are showing "customs delays" or those with power outages or any other item of interest that is being monitored. The screen can also be filtered to show only those seaports that meet certain monitoring criteria. Moreover, in response to a user input (via e.g., mouse, keypad, stylus, trackball, track wheel, etc.), a tile 202 can be opened-up to reveal additional tiles (see e.g., tiles 744, 754 of FIGS. 18 and 19, respectively) associated with the main tiles 302. Additionally, in response to a user input (via e.g., mouse, keypad, stylus, trackball, track wheel, etc.), a tile 202 can be opened-up to reveal the underlying data causing the displayed status of the tiles.

Figure 4A:
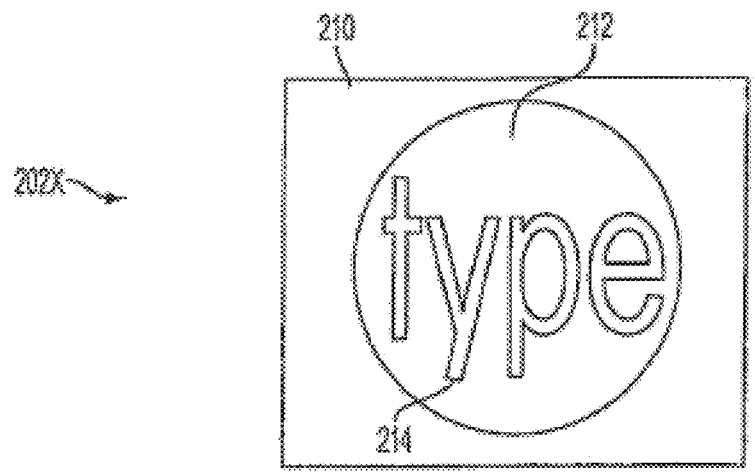
FIGS. 4a and 4b illustrate the concept of layering utilized in a system constructed in accordance with an embodiment of the invention.
Figure 4B:
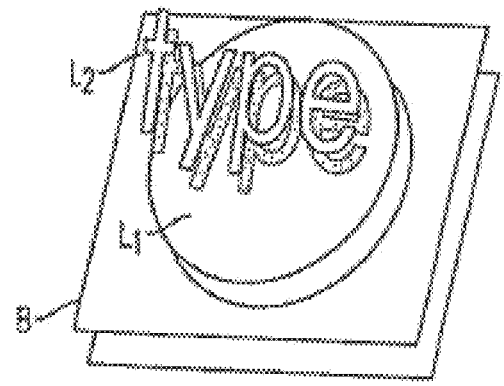

FIGS. 4a and 4b illustrate the concept of layering while FIGS. 5-10 illustrate a specific example. In FIG. 4a, a display tile 202x is shown having the text "type" 214 inside a circle 212 and on top of a background 210. Viewing FIG. 4a, it appears that there is only one unified image. In accordance with an embodiment described herein, and as illustrated in FIG. 4b, there are actually three separate image layers: (1) a first layer L1 containing the circle; (2) a second layer L2 containing the text "type"; and (3) a background B. The layers L1, L2 contain one image each, the remaining portions of the layer are transparent such that when one layer L2 is stacked over another layer L1 (and over the background B) each layer image is displayed in what appears to be a single image. This allows one image to be changed without disturbing the other images on other layers.

Figure 5:
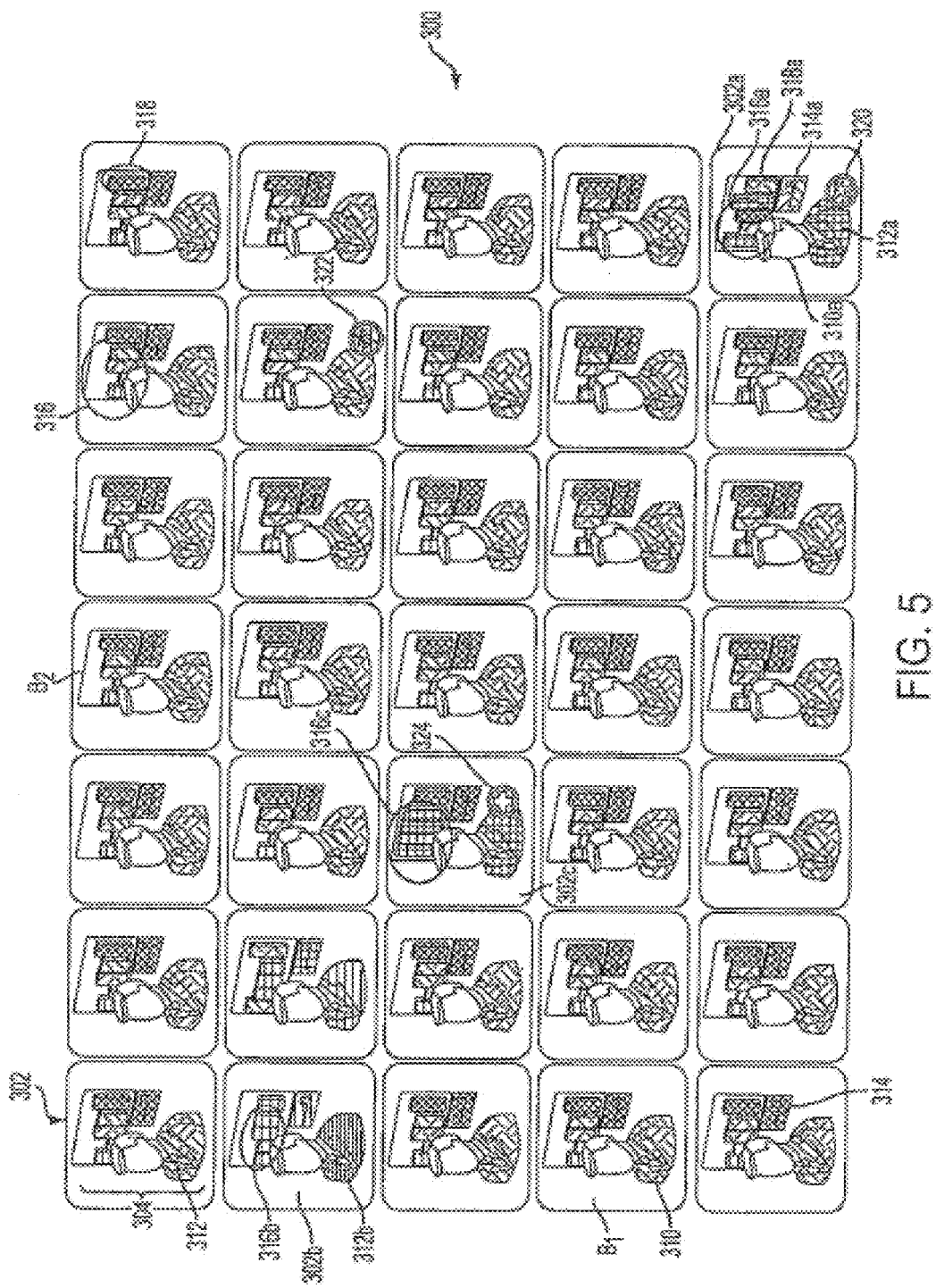
FIG. 5 illustrates another example mosaic display output from a system constructed in accordance with an embodiment of the invention.

FIG. 5 illustrates another example mosaic display 300 output from a system constructed in accordance with another embodiment (e.g., systems 10 or 110). The display 300 comprises a plurality of display tiles 302 shown in an array of rows and columns, each tile 302 comprising an image of an object 304 being monitored by the system. In the illustrated example, the object 304 corresponds to the status of employee performance such as e.g., the performance of a salesman or saleswoman (although only men images are illustrated). Each display tile 302 in the mosaic display 300 represents a particular salesman and the image object 304 illustrates key criteria/attributes associated with the salesman's performance that are to be monitored. In the illustrated example, the object 304 contains images of the salesman 310 upon which a suit image 312 will be used to represent the overall employee performance/score. The object 304 will also include a credit card image 314 representing the salesman's expenses and a bar graph whereby the four left-most bars 316 represent the salesman's performance over the past four rolling quarters and the right-most bar 318 represents the salesman's sales pipeline. An out-of-office status image can also be displayed if the salesman is out of the office that day. In the illustrated example, there is a palm tree image 322 for vacation, an airplane image 320 for travel, and a hospital cross image 324 for sick leave. If the employee is in the office, no out-of-office image is displayed. The illustrated example also contains white background B1 and bar graph background B2 images to help make the object 304 easier to view.

Each image 310, 312, 314, 316, 318, 320, 322, 324 within a tile 302 can be selected from one of a plurality of image layers. Most layers comprise the image associated with an attribute being monitored (e.g., credit card) in a color or with another type of marking that makes it clear what the status of the attribute is at that moment. For these layers, each layer is linked to a value, threshold, or range of values that represents a particular status of that attribute. Some layers contain a different image to represent a different status for an attribute. For example, the out-of-office status will have a clear image when the employee is in the office, a palm tree image 322 when the employee is on vacation, an airplane image 320 when the employee is on travel, and a hospital cross image 324 when the employee is out sick. The application server 120 (FIG. 2) determines from the monitored data which layer is to be displayed for a particular attribute so that a current state of that attribute is displayed within the tile 302. Other layers are merely background images B1, B2 or images to complete the overall object 304 (e.g., image 310).

The images of each layer are chosen to be easily recognizable as (or associated with) the attribute being monitored. For example, in the salesman example, there are layers comprising images that represent the salesman's expenses (credit card), performance over the past 4 rolling quarters (left-most 4 bars in the bar graph), sales pipeline (right-most bar in the bar graph), overall employee score (color of suit), and out of office status (e.g., a palm tree for vacation, an airplane for travel, cross for sick leave, etc.). The colors of the layers can be selected to represent the status of an attribute as follows: dark blue may indicate a status that is severely below what is expected; light blue may indicate a status that is slightly below what is expected; green may indicate a status that the salesman is meeting the expected performance; orange may indicate a status that is slightly above what is expected; and gold may indicate a status that greatly exceeds what is expected. Moreover, referring in this example to the bar graph, the images on the layers can have different sizes. For example, the size of the bars in the bar graph may vary from no bar to a very large bar to further indicate the status of the salesman's performance during the quarters (or the size of the associated pipeline).

To achieve the bottom right employee tile 302a, there is one layer containing a gold suit image 312a, one layer containing a green credit card image 314a, four layers containing one of the four left-most bars 316a in the bar graph (the first layer contains a long yellow bar, the second layer contains a short green bar, the third layer contains a longer orange bar, and the fourth one containing another long yellow bar), one layer containing a mid-size green right-most bar image 318a, and one layer containing the airplane image 320 for the business travel out-of-office status. By comparison, tile 302b contains a blue suite image 312b and shorter blue left-most bar images 316b in its bar graph, which represent different statuses for the salesman associated with tile 302b when compared to the salesman associated with tile 302*a*. Tile 302*c*, which represents another salesman, illustrates four of the largest available left-most bars 316, each in a gold color, which in the illustrated example is an indication of the highest achievable status for the attribute. Tile 302*c* also indicates that the employee is out sick (via image 324). In operation, when input data dictates that an attribute has changed status, a new layer containing the appropriate image is brought to the top of the layers, which supplants the prior image of that element, but does not change the images of other elements/ attributes being displayed thru other layers. The changing mosaic allows managers to quickly and accurately make the decisions required to maintain the appropriate operational level for the entire system (in this case a group of employees) and rapidly pinpoint areas that need to be addressed.

Figure 9:
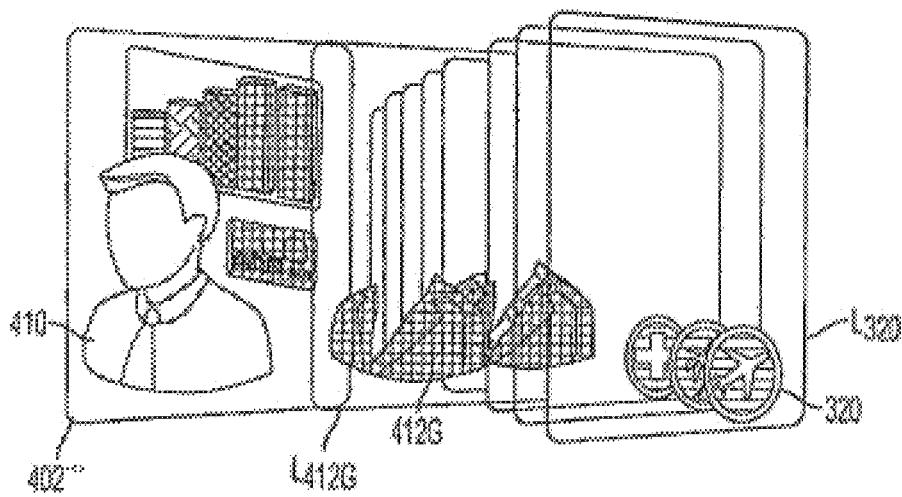
FIG. 9 illustrates a modified version of the FIG. 8 title using layering in accordance with an embodiment of the invention.
Figure 10:
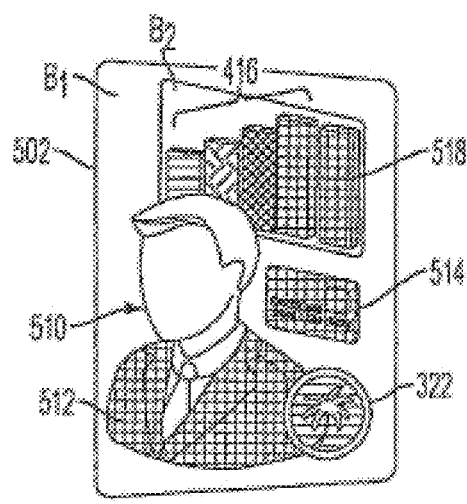
FIG. 10 illustrates a modified version of the FIG. 9 title in accordance with an embodiment of the invention.

The illustrations of FIGS. 6-10 are used to describe an example operation of the system of an embodiment whereby a particular salesman's status changes from the status displayed in FIG. 6 to the status displayed in FIG. 10. FIG. 6 illustrates a tile 402 comprising a salesman 410 having a green suit 412. A clear background B1 is also displayed. A light blue credit card image 414 indicates that the salesman's expenses are slightly below what is expected. Over the bar chart background B2, there are layers containing a small blue left-most bar 416*a*, a slightly longer green bar 416*b*, slightly longer orange bar 416*c*, and long gold bar 416*d* to represent the status of the salesman's last four rolling quarters (collectively 416). That is, four different bar heights and four different colors are used in the last four rolling quarters bar chart (collectively 416). Each bar color and length combination is its own layer representative of a particular status. A long, but not the longest, orange bar 418 is used to represent the salesman's pipeline, which e.g., is slightly above expectations. In addition, the employee is currently working in the office since there is no out-of-office image (i.e., a layer with a blank image in the out-of-office status position is used).

During the monitoring period, data is received indicating that the salesman's pipeline (represented by image 418) has improved to the greatly exceeds expectations status. As such, the application server 20 (FIG. 1), 120 (FIG. 2) determines that a new layer containing the tallest gold pipeline bar graph image 418' (FIG. 7) must be displayed. The layer associated with this image 418' is selected from the available layers (illustrated next to the updated tile 402' for explanation purposes only) and is brought to the top of the tile, changing the FIG. 6 tile 402 to the FIG. 7 tile 402'.

Subsequently, data is received indicating that the salesman's expenses have also improved to the status of greatly exceeds expectations. As such, the application server 20 (FIG. 1), 120 (FIG. 2) determines that a new layer containing a gold credit card image 414' (FIG. 8) must be displayed. The layer associated with this image 418' is selected from the available layers (illustrated next to the updated tile 402" for explanation purposes only) and is brought to the top of the tile, changing the FIG. 7 tile 402' to the FIG. 8 tile 402".

Subsequently, data is received indicating that the salesman's overall score has improved to the status of greatly exceeds expectations. As such, the application server 20 (FIG. 1), 120 (FIG. 2) determines that a new layer containing a gold suit image 412G (FIG. 9) must be displayed over the salesman image 410 (which when uncovered by a suit layer, comprises only a head, shirt and tie of the salesman). The layer L412G (FIG. 9) associated with the gold suit image 412G is selected from the available layers. FIG. 9 is at an intermediate stage where the selected layer L412G has not yet been brought to the top of the tile 402'''. FIG. 9 also shows a layer L320 comprising the airplane image 320 used to represent an out-of-office status; in this example, however layer L320 is not selected because the salesman is still in the office.

In FIG. 10, it can be seen that the layer L412G associated with the gold suit image 412G was brought to the top of the FIG. 9 tile 402''' creating an updated tile 502. At some point, data was received indicating that the salesman is on vacation and the application server 20 (FIG. 1), 120 (FIG. 2) determined that a new layer containing a palm tree image 322 must be displayed. As such, the FIG. 10 tile 502 also contains the palm tree image 322 to reflect that the salesman is on vacation. Thus, the completed tile 502 comprises a background B and a salesman image 510 covered by a layer comprising a gold suit image 512. The bar chart background B2 comprises the same left-most bar chart image 416 (as that status was not changed in this example) and an updated right-most bar 518 (to reflect the change in pipeline status described above). The tile 502 contains the updated credit card image 514 and the updated out-of-office palm tree image 322.

As can be seen from the above example, an observer can quickly determine changes in attribute status because of the layering technology used by the systems 10, 110. That is, layers containing images that are easily identifiable with the attribute being monitored are used. The size and color of the images may vary to further reflect changes in status of the attributes. Moreover, because identifiable images are being used to represent the status of the appropriate attribute, users/observers are not required to memorize a plurality of location-to-attribute correlations as is required to use the prior art systems. It should be appreciated that text and/or symbols may also be used as forms of labeling for the tiles or they may be used to represent additional status indicators; as with all layers, the images chosen, the color, size, text and/or symbology used to represent the status of an attribute should be chosen by a system administrator/observer or other authorized personnel to visually represent the attribute in a manner that can be easily identifiable. Accordingly, the embodiments described herein are not limited to any particular image/color/symbol/size combination.

Figure 11:
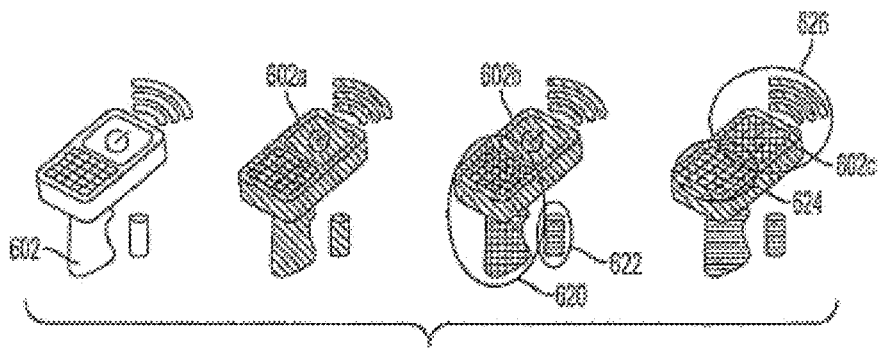
FIGS. 11-19 illustrate respective examples of tiles that can be displayed in accordance with embodiments of the invention.

FIGS. 11-19 illustrate respective examples of display tiles that can be displayed in accordance with the embodiments described herein. The examples are not intended to be limiting, and are supplied only to further illustrate the scalability and visual perspectives that may be achieved with the systems 10 (FIG. 1), 110 (FIG. 2) described herein. FIG. 11 illustrates tiles 602, 602*a*, 602*b*, and 602*c* associated with network or communications devices being monitored. Tile 602 illustrates a gray device e.g., having no information at that point in time. Alternatively, the color gray could represent a particular status level, if desired. The tile 602 can be used to convey status information about the device battery, boots, key strokes, network connectivity, and/or number of scans. Tile 602*a* represents a green device representing one status of the attributes for the monitored device Tile 602*b*, on the other hand, has a first portion 620 having a yellow status for the circled attributes of the device, and a second portion 622 having a blue status for the battery of the device. Each portion 620, 622 is a different layer placed on top of the prior layers of tiles 602 and 602*a* to reflect the change in status of the particular attributes of the device. Tile 602*c* has a portion 624 having a purple status for the circled keypad attribute and another second portion 626 having a yellow status for circled attribute of the device. Each portion 624, 626 is a different layer that is placed on top of the prior layers of tiles 602, 602a and 602b to reflect the change in status of the particular attributes of the devices.

Figure 12:
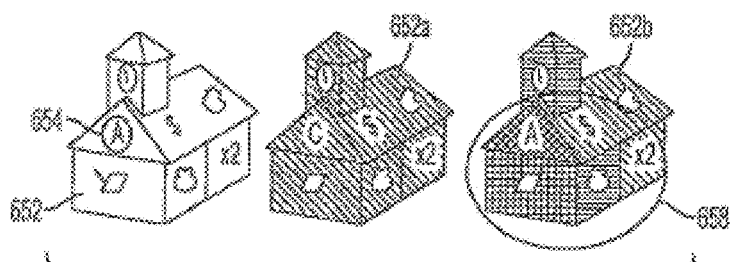

FIG. 12 illustrates tiles 652, 652a, 652b associated with a school being monitored by the systems 10 (FIG. 1), 110 (FIG. 2) described herein. Attributes whose statuses that can be monitored and displayed can include e.g., attendance, grades, test scores, budget, class size, poverty level and dual enrollment, to name a few. Tile 652 shows a gray school image, but includes several symbols on the school to reflect a different type of status. For example, image 654 includes the Symbol "A" to reflect a grade for the school. Other symbols (e.g., $, apple, etc.) can also be used to reflect other attributes. The symbols may be a form of labeling for the tile 652 or they may be additional status indicators, as chosen by the system administrator/observer or other authorized personnel. Tile 652a represents a green school representing one status of the attributes for the monitored school. Tile 652b, includes several different colored portions, represented by the circle 658, each portion reflecting a separate status. As with all tiles described herein, each image/color/symbol combination illustrated in FIG. 12 is a respective image layer, which is associated with a threshold, range of values, etc. to visually represent a status of the attribute.

Figure 13:
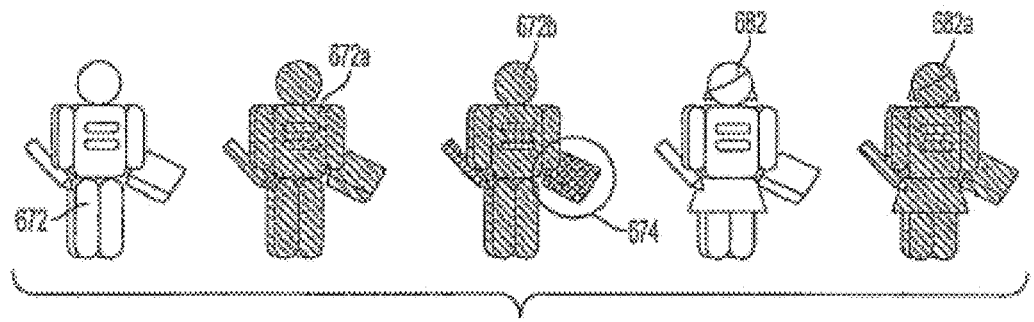

FIG. 13 illustrates tiles 672, 672a, 672b, 682, 682a associated with students being monitored by the systems 10 (FIG. 1), 110 (FIG. 2) described herein. Tiles 672, 672a, 672b represent a male student while tiles 682, 682a represent a female student. Attributes whose statuses that can be monitored and displayed can include e.g., communications, life skills, social skills, writing, math, reading and discipline. Tiles 672 and 682 are gray indicating e.g., that no status information is presently available. Alternatively, the color gray could represent a particular status level, if desired. Tiles 672a, 682a are green representing a status of each attribute being associated with a green image. Tile 672b has several different images (associated with different layers) in comparison to tile 672a such as the orange book image 674.

Figure 14:

FIG. 14 illustrates two tiles 692, 696 that may be suitable for monitoring military personnel. Tile 692 comprises an image of a blue soldier (one layer) having an image of a gun 694 (second layer) superimposed on the soldier. Tile 696 includes an image of multiple soldiers that may be used to represent a division, battalion, etc. being monitored.

Figure 15:
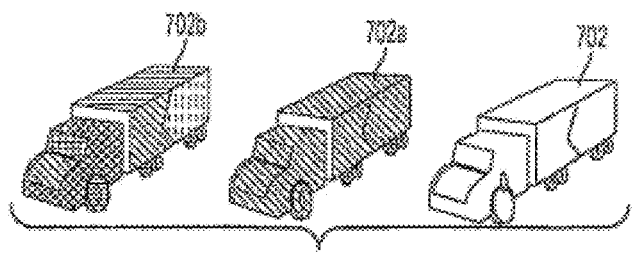

FIG. 15 illustrates tiles 702, 702a, 702b associated with delivery vehicles being monitored by the systems 10 (FIG. 1), 110 (FIG. 2) described herein. Attributes whose statuses that can be monitored and displayed can include e.g., time between stops, time at a stop, average time per call, number of deliveries, orders placed, vehicle utilization and miles per day. Tile 702 is gray indicating e.g., that no status information is presently available. Alternatively, the color gray could represent a particular status level, if desired. Tile 702a is green representing a status that each attribute is associated with a green image. Tile 702b has several colored portions (each associated with a different layer) in comparison to tile 702a such that several attributes have different statuses when compared to tile 702a.

Figure 16:
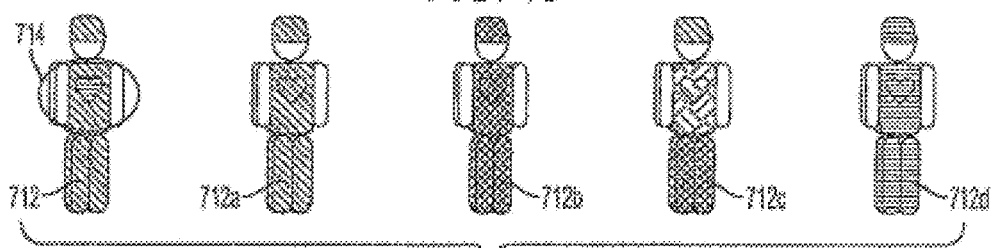

FIG. 16 illustrates tiles 712, 712a, 712b, 712c, 712d associated with patients being monitored by the systems 10 (FIG. 1), 110 (FIG. 2) described herein. Attributes whose statuses that can be monitored and displayed can include e.g., the patient's temperature, respiratory system, pulse and activity. Tile 712 contains an image of a green patient with a blue heart image 714, representing different statuses for the attributes of the patient. Tile 712a illustrates a green heart, which represents a change from tile 712 (while also providing its own status). Tile 712b illustrates the patient in all orange, tile 712d illustrates the patient in all blue, while tile 712c contains different color images for the legs, chest and heart and head. As with all other tiles discussed herein, each attribute status is displayed using an appropriate layer, which appear as a single unified image.

Figure 17:
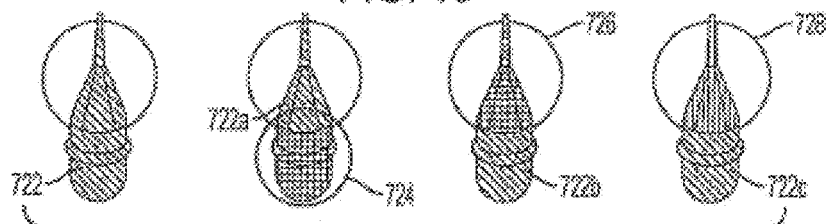

FIG. 17 illustrates tiles 722, 722a, 722b, 722c associated with a communications device being monitored by the systems 10 (FIG. 1), 110 (FIG. 2) described herein. Attributes whose statuses can be monitored and displayed using appropriate layers can include e.g., communications and electrical functionality of the device. Tile 722 illustrates all attributes having a green status. Tile 722a illustrates that a layer having a yellow image 724 has been placed over a green portion in tile 722. Tile 722b illustrates that a layer having a yellow image 726 has been placed over a green portion in tile 722a and that a layer having a green image has been placed over the layer comprising the yellow image 724 in tile 722a. Tile 722c illustrates that a layer comprising a red image 728 has been placed over the layer comprising the yellow image 726 of tile 712b.

Figure 18:
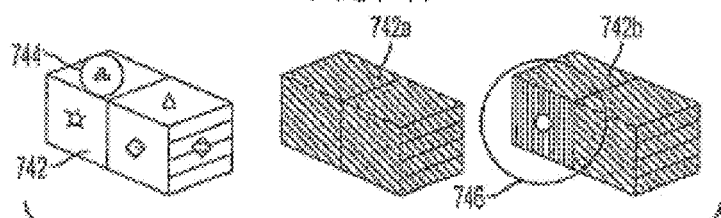

FIG. 18 illustrates tiles 742, 742a, 742b associated with a cargo container being monitored by the systems 10 (FIG. 1), 110 (FIG. 2) described herein. Attributes whose statuses can be monitored and displayed using appropriate layers can include the contents of the container such as e.g., urine, chemicals, explosives, flammable material and radioactive material. Tile 742 illustrates all attributes having a gray status (which may mean that no information has been received or it may mean that a particular status level has been reached), but also includes symbols such as e.g., the radioactive symbol image 744. The symbols may be a form of labeling for the tile 742 or they may be additional status indicators, as chosen by the system administrator/observer or other authorized personnel. It should be appreciated that the symbols are provided on layers that can be superimposed on other layers containing the color/shape of the appropriate portions of the container or that the symbol and the color/shape of the appropriate portion of the container may be on the same layer, if desired. Tile 742a illustrates that all attributes have a green status; moreover, tile 742a does not contain any symbols. Tile 742b illustrates that one portion of the container has changed status when compared to tile 742a. That is, tile 742b contains an image 746 that is a red portion of the container along with a star symbol representing that the container now contains explosive materials.

Figure 19:
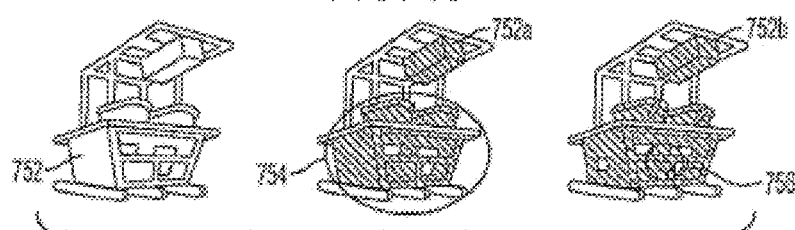

FIG. 19 illustrates tiles 752, 752a, 752b associated with a vessel being monitored by the systems 10 (FIG. 1), 110 (FIG. 2) described herein. Attributes whose statuses that can be monitored and displayed using appropriate layers can include the fuel, electrical and mechanical statuses of the vessel. Tile 552 is gray indicating e.g., that no status information is presently available. Alternatively, the color gray could represent a particular status level, if desired. Tile 752a illustrates that some attributes have a green status as shown e.g., by green image 754. Tile 752b illustrates that one portion of the vessel now contains a wrench symbol image 756 to represent a mechanical status of the vessel. The symbol may be a form of labeling for the tile 752b or it may be another status indicator, as chosen by the system administrator/observer or other authorized personnel.

Figure 20:
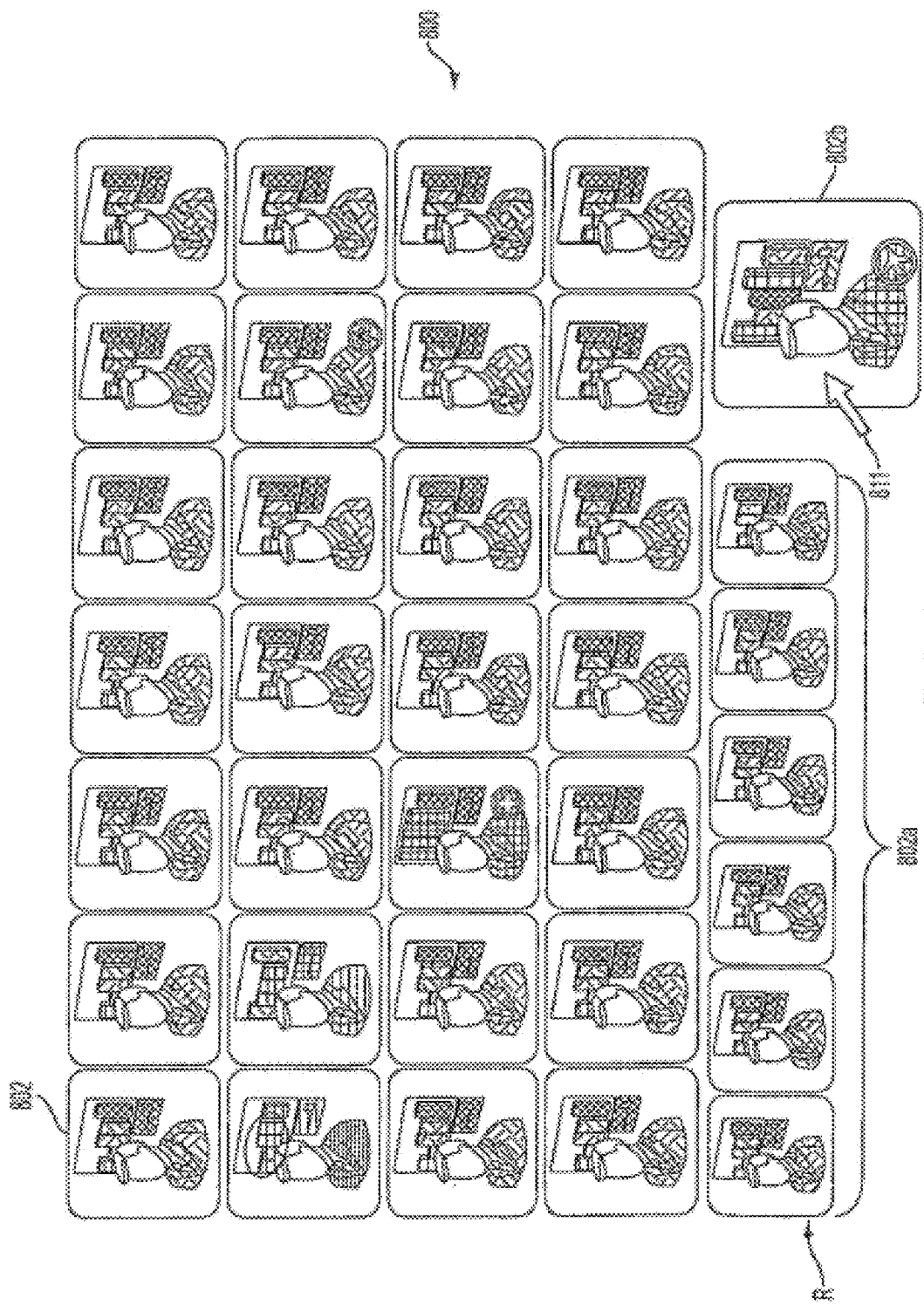
FIG. 20 illustrates an example mosaic display whereby one tile is magnified (and other tiles are shifted and shrunk) in accordance with an embodiment of the invention.

FIG. 20 illustrates an example mosaic display 800 whereby one tile 802b is magnified (and other tiles 802a are shifted and shrunk) in accordance with another embodiment. The mosaic display 800 comprises a plurality of tiles 802 and normally has the appearance of the mosaic 300 illustrated in FIG. 5. However, the systems 10 (FIG. 1), 110 (FIG. 2) described herein allow a user to move a cursor 811

(via e.g., mouse, keypad, stylus, trackball, track wheel, etc.) over a tile of interest (e.g., tile 802*b*) so that the user can see an enlarged tile. In response to the cursor movement and/or selection by the user, the application server 20 (FIG. 1), 120 (FIG. 2) enlarges/magnifies (i.e., proportionally increases the size of) tile 802*b*. At the same time, the application server 20 (FIG. 1), 120 (FIG. 2) shrinks (i.e., proportionally decreases the size of) other tiles 802*a* in the same row R as tile 802*b* so that all of the tiles in the mosaic 800 can still be viewed.

The processing described herein may be implemented in one or more hardware, software, or hybrid components residing in (or distributed among) one or more local or remote systems. Indeed, even a single general purpose computer executing a computer program stored on a recording medium to produce the functionality and/or implement any of the storage devices referred to herein may be utilized to implement the illustrated embodiments. User interface devices utilized by, in, or, in conjunction with the systems 10, 110 may be any device used to input and/or output information. The interface devices may be implemented as a graphical user interface (GUI) containing a display or the like, or may be a link to other user input/output devices known in the art.

Figure 21:
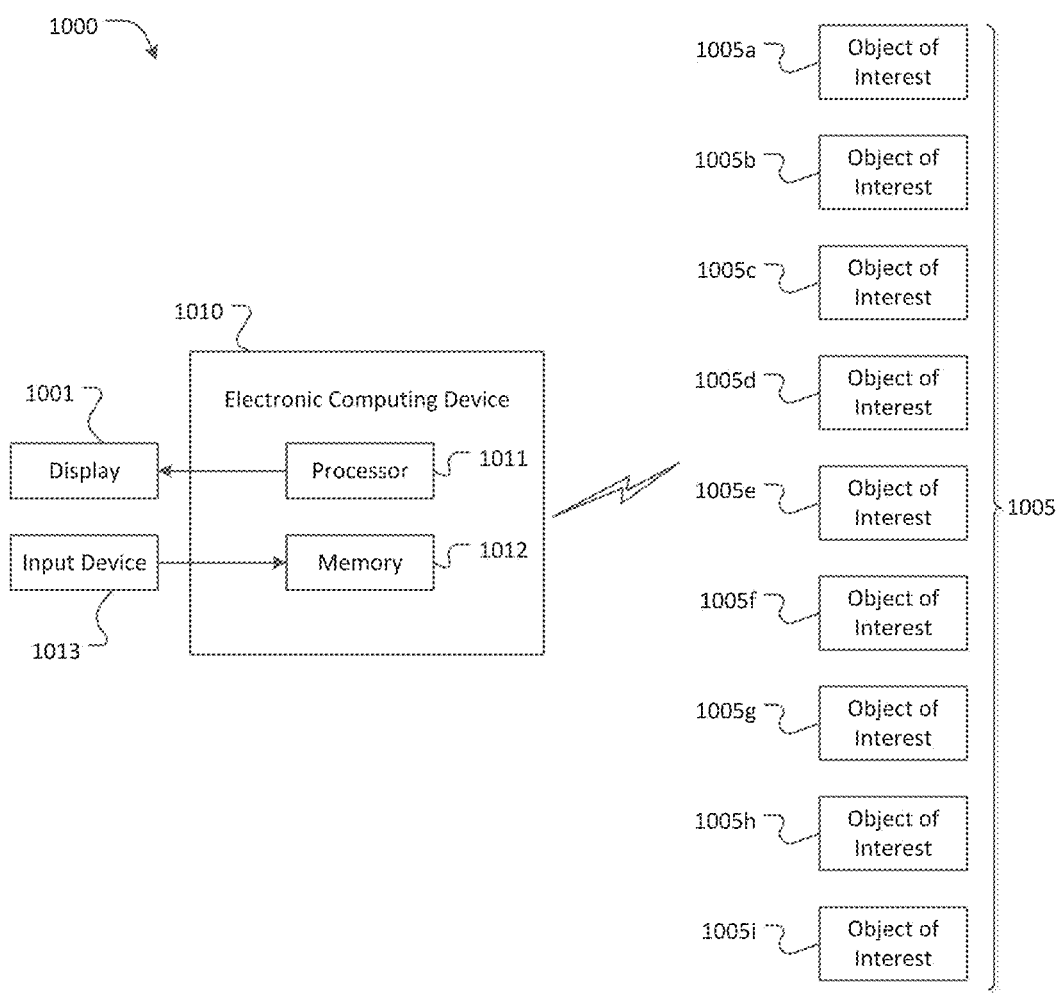
FIG. 21 is a schematic diagram of a system for displaying a system status or the status of objects of interest in accordance with an embodiment of the present invention.
Figure 22:
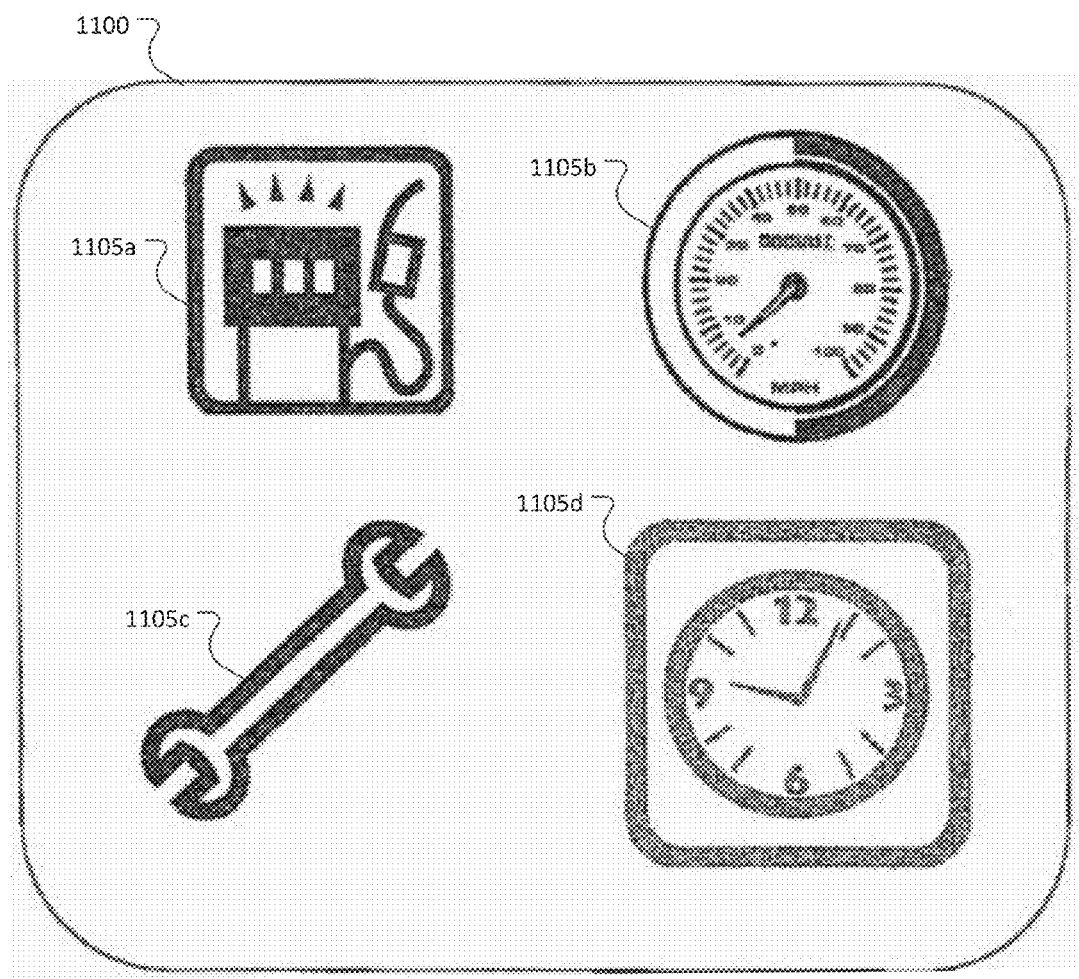
FIG. 22 is a diagram of a display tile comprising icons in accordance with an embodiment of the present invention.
Figure 23:
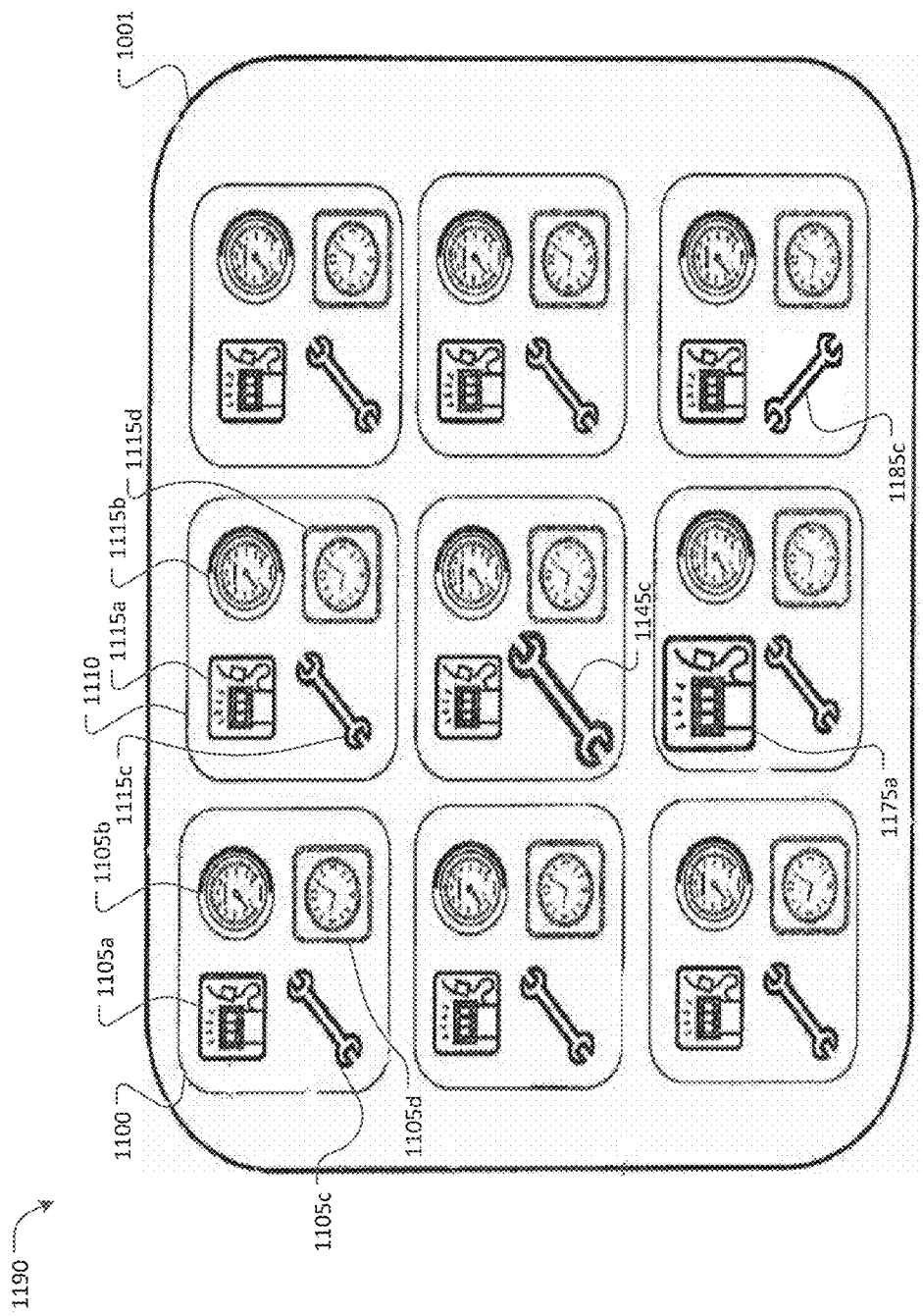
FIG. 23 is diagram of a mosaic image comprising display tiles corresponding to objects of interest in accordance with an embodiment of the present invention.

Referring to FIGS. 21-23, a system 1000 for displaying the statuses of a plurality of objects of interest 1005 (e.g. objects of interest 1005*a*-*i*) is now described. Each of the objects of interest 1005 may be, for example, a human, a machine, or a part of a process. For illustrative purposes, fleet vehicles are used as exemplary objects of interest 1005 in the exemplary embodiment described with relation to FIGS. 21-23. Salespersons, marine vessels, call center personnel and students are used as exemplary objects of interest in other examples provided below; however, each of the objects of interest could be another type of object or a process (as further described below).

The system 1000 includes a display 1001 and at least one electronic computing device 1010 coupled to the display 1001. The electronic computing device 1010 includes a processor 1011 and memory 1012 coupled to the processor. The processor 1011 may cooperate with the memory 1012 to perform functions of displaying a status of an object (or process) of interest or a system status, as will be described in further detail below.

The display 1001 may be coupled directly to the electronic computing device 1010, as illustrated or alternatively, may be coupled to a remote computing device that is coupled to the electronic computing device 1010, for example, over a communications network. The electronic computing device may be, for example, a computer, a server, or a mobile device, such as, for example a smartphone, a tablet, or head-mounted display (e.g. Google® glasses). The display 1001 may be any type of display, for example, and may be part of a smartphone, a tablet, head-mounted display, or other computing device. One or more input devices 1013 may be coupled to the electronic computing device 1010. In some embodiments the input devices 1013 may be coupled to the electronic computing device 1010 indirectly via, for example, a remote computing device. The input devices 1013 may include, for example a keyboard, mouse, trackpad, finger sensor, or touchscreen display.

The electronic computing device 1010 is configured to receive data related to a plurality of status attributes for each of the objects of interest 1005. For example, where the objects of interest 1005 are fleet vehicles, the electronic computing device 1010 is configured to receive data related to a plurality of status attributes for each vehicle in the fleet. The status attributes for this example may include speed, fuel levels, maintenance history, and idle time. Although four exemplary status attributes are given here, any number or type of status attributes may be related to the object of interest. The data relating to those status attributes may be collected via data entered at local or remote computing devices or associated sensors. The data may also be existing data stored on local or remote computing device. Data may be transmitted wirelessly using any wireless communication techniques. In embodiments, the data relating to the status attributes may be collected and transmitted via a wired interface.

Each status attribute has an icon associated with it. For example, as illustrated in FIG. 22, with respect to a given fleet vehicle 1005*a* as the object of interest, the fuel level may be represented by an icon of a fuel pump 1105*a*, the speed may be represented by an icon of a speedometer 1105*b*, the maintenance status may be represented by an icon of a wrench 1105*c*, and the idle time may be represented by an icon of a clock 1105*d*. Any type of icon may be associated with each status attribute, but it may be desirable that each icon be easily visually correlated to the status attribute. Additionally, any number of status attributes may have an associated icon.

The electronic computing device 1010 is configured to determine an icon display characteristic for each icon (e.g. icons 1105*a*-*d*) based upon the received data and indicative of a value of the associated status attribute. The icon display characteristic may be, for example, an icon display color, an icon display pattern (e.g. hash marks, grid marks, dots), an icon display size, an icon display shape, or an icon display position. An example of icon display size and icon display position is shown in FIG. 23. As shown, icon 1105*c* is smaller in size than icon 1145*c*, icon 1105*a* is smaller in size than icon 1175*a*, and icon 1105*c* is positioned different than icon 1185*c*. The icon display characteristic may include other or additional attributes.

The electronic computing device 1010 is configured to update a given icon display characteristic based upon a change in received data. More particularly, the electronic computing device 1010 may be configured to update the icon display characteristic based upon the value exceeding a predetermined threshold, coming within a predetermined threshold (or range), or dropping below a predetermined threshold. In the example of the fleet vehicle 1005*a*, if, for example, a warning threshold speed was set at 60 mph and a maximum threshold speed was set at 65 mph, the color of the vehicle speed icon 1105*b* may be updated from green, to yellow, and then to red, as the speed of the vehicle (and thus the values of vehicle speed data) progress from 50 to 70 mph. The icon display characteristic may be updated in real time or near real time. Other or additional display characteristics may be updated, for example, icon display size or icon display position, based upon one or more thresholds, which may be user defined.

The electronic computing device 1010 is also configured to generate a respective display tile for each object of the objects of interest 1005. For example, as illustrated in FIGS. 22-23, display tile 1100, representing object of interest 1005*a*, is generated by combining respective icons 1105*a*-*d* so that each icon with its icon display characteristic remains visible. In the example of fleet vehicles, a respective display tile 1100 may include an icon of each status attribute, i.e., fuel pump 1105*a* for the fuel level, speedometer 1105*b* for the speed, wrench 1105*c* for the maintenance history, and clock 1105*d* for the idle time. The display tile 1100 may be generated so that any number of icons may be combined so long as each icon with its icon display characteristic remain visible or at least partially visible. The display tile 1100 can provide a visual status of the object of interest 1105a, which, in the example provided here is a given fleet vehicle. More particularly, a user, for example a fleet manager, may look at the display tile 1100 corresponding to a given fleet vehicle or object of interest, and may relatively quickly and easily ascertain that vehicle's status.

The electronic computing device 1010 may generate a display tile, similar to display tile 1100, for each object of interest 1005a-i. In the example of fleet vehicles, a tile may be created for each vehicle in the entire fleet of vehicles. Since nine objects of interest (i.e. objects of interest 1005a-i) are used in this exemplary system 1000, nine tiles are generated as shown in FIG. 23. The display tiles (e.g. display tiles 1100 and 1110) may also have a tile display characteristic, for example, color or pattern. The tile display characteristic may, for example, correspond to the overall status of the object of interest, or have a tile display characteristic that is based upon combined icon display characteristics.

The electronic computing device 1010 may combine the display tiles of the fleet vehicles into a mosaic image 1190 representative of the overall fleet system status. The mosaic image 1190 may be displayed on the display 1001. The mosaic image 1190 may include any number of tiles including, for example, thousands of tiles, which may only be viewable by scrolling through a displayed mosaic image. A mosaic image can include as little as two display tiles. A three-by-three display mosaic having display tiles from objects of interest 1005a-1005i is illustrated in FIG. 23. For example, display tile 1100 represents fleet vehicle (or object of interest) 1005a as described above and display tile 1110 comprising fuel pump 1115a representing the fuel level, speedometer 1115b representing the vehicle speed, wrench 1115c representing the maintenance history, and clock 1115d representing the idle time, corresponds to fleet vehicle (or object of interest) 1005b. The display tiles may be displayed in other display arrangements, for example, in a stacked or overlapping relationship, as will be described in further detail below.

In addition to the relatively quick status that may be visually obtained for a given fleet vehicle, the vehicle system status for the entire fleet may be similarly visually obtained relatively easily and quickly, for example, as compared to parsing a spreadsheet of numerical data. The data visually obtained from the mosaic image 1190 may be particularly useful for generation of metrics, quality assurance, and/or planning purposes, for example.

If, for example, a given object of interest 1105a has a status that is not within a given threshold, the corresponding display tile 1100 may be selected by the user via the input device 1013 and enlarged on the display 1001. For example, if a given fleet vehicle 1105a consistently exceeds the speed threshold, and has an undesirable idle time, the corresponding display tile 1100 may be enlarged relative to the other display tiles in the mosaic image 1190. In some embodiments, the other display tiles may be reduced in size relative to the selected display tile.

The icon that, for example, may be adversely affecting the status of the given fleet vehicle may also be selected by the user. The received data corresponding to the status attribute of the icon may be displayed in further detail below, either graphically, as will be discussed in further detail below, or in a numerical table. In the example of the given fleet vehicle's speed, the fleet vehicle's speed may be displayed over the time of day.

While the example of a vehicle fleet has been described as the object of interest, the system 1000 described herein may be applied to any object or device, for example, aircraft, vessels, warehouse machinery, etc. The system 1000 may also be applied to people, for example, sales personnel or call center personnel, and may also be applied to a process, for example, an incident response or order fulfillment process.

Additionally, the functions of the electronic computing device 1010 may be performed across more than one processor 1011, and/or more than one electronic computing device may be used. Moreover, the functionality of the electronic computing device 1010, as described herein may be included as corresponding instructions on a non-transitory computer readable medium.

While the mosaic image 1190 can relay an increased amount of information about a system status, it may be desirable to order, sort, group, and/or filter the display tiles in the mosaic image 1190. For example, a user may order, sort, group, and/or filter the display tiles to highlight or focus on certain status attributes. For example, the display tiles may be sorted based upon overall status or performance. A filter that may be relatively complex may be applied to the display tiles and may remove or add display tiles to the mosaic image 1190 based upon a change in the received data related to one or more of the status attributes in interest. The display tiles in the mosaic image 1190 may be updated and displayed at a predetermined time threshold, or may be updated in real time. The display tiles may be sorted based upon any status attribute or any of the received data. In other words, the display tiles may be sorted based upon data, for example time, that may not be associated with a status attribute, and thus an icon.

With respect to grouping, the display tiles may be grouped in rows or columns based upon a status attribute, for example. The display tiles may be grouped in other arrangements, and/or may be grouped based upon received data or status attributes.

In an embodiment, the electronic computing device 1010 may be configured to determine a future icon display characteristic based upon received data and indicative of a predicted future value of the associated status attribute. In other words, the future icon display characteristic of each icon is based upon historical data or a collection of received data. The electronic computing device 1010 advantageously determines each future icon display characteristic by applying predictive analysis techniques to the received data. For example, the electronic computing device 1010 may apply a Monte Carlo analysis or a regression analysis. The server combines the respective icons, including the future icon display characteristic, on a respective display tile. The electronic computing device 1010 displays the mosaic image on the display 1001, the mosaic image being of a predicted system status for the objects of interest. Further details of predictive techniques may be found in U.S. Patent Application Publication No. 2009/0315891 to Lesser et al., the entire contents of which are herein incorporated by reference.

Figure 24:
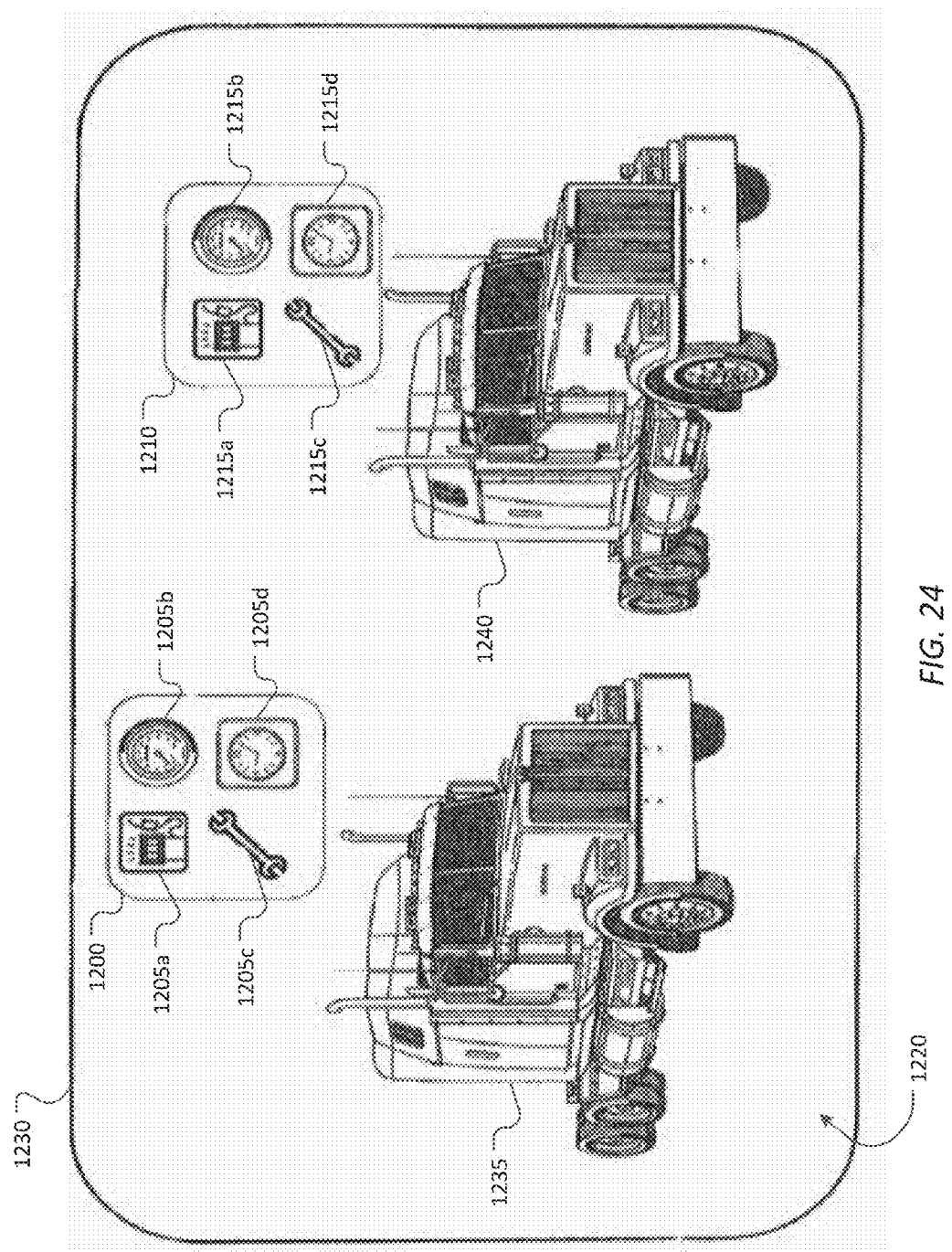
FIG. 24 is diagram of a display of a video feed of fleet vehicles and associated display tiles in accordance with an embodiment of the present invention.

Referring now to FIG. 24, in an embodiment, display tiles 1200 and 1210 may be used in an augmented reality environment. More particularly, display tiles 1200 and 1210 are overlaid on a video feed 1220 in the display 1230 that includes the objects of interest 1235 and 1240. The video feed, may be, for example, a live video feed. Illustratively, the objects of interest 1235 and 1240 are vehicles, and more particularly, trucks, but may be any object of interest, such as, for example, ships, people, or machinery. Display tile 1200, which provides status information for object of interest 1235, is positioned in proximity to object of interest 1235. Likewise, display tile 1210, which provides status information for object of interest 1240, is positioned in proximity to object of interest 1240. The position of each display tiles 1200 and 1210 relative to their corresponding objects of interest 1235 and 1240 in the video feed 1220 may be based upon global positioning system (GPS) coordinates, a real-time video analysis, and/or hard-coded grid coordinates, such as, for example, a position within a building.

Each of display tiles 1200 and 1210 illustratively includes icons 1205*a*-*d* and 1215*a*-*d*, respectively, associated with data related to status attributes. The icons 1205*a*-*d* and 1215*a*-*d* have display characteristics based upon the received data for their respective objects of interest and are indicative of a value of the associated status attribute. Illustratively, display tile 1200 indicates the status attributes of a fuel level via icon 1205*a*, speed history via icon 1205*b*, maintenance history via icon 1205*c*, and idle time via icon 1205*d* and display tile 1210 indicates the status attributes of a fuel level via icon 1215*a*, speed history via icon 1215*b*, maintenance history via icon 1215*c*, and idle time via icon 1215*d*. Other and/or additional attributes may also be displayed. Because of the visual nature of an augmented reality environment, the overlay of display tiles 1200 and 1210 over the video feed 1220 provides an increased amount of information in an more easy to understand visual nature. In addition to the icons 1205*a*-*d* and 1215*a*-*d*, display tile 1200 and 1210 may include text, which may be in the form of a hyperlink to more detailed or other information.

Figure 25:
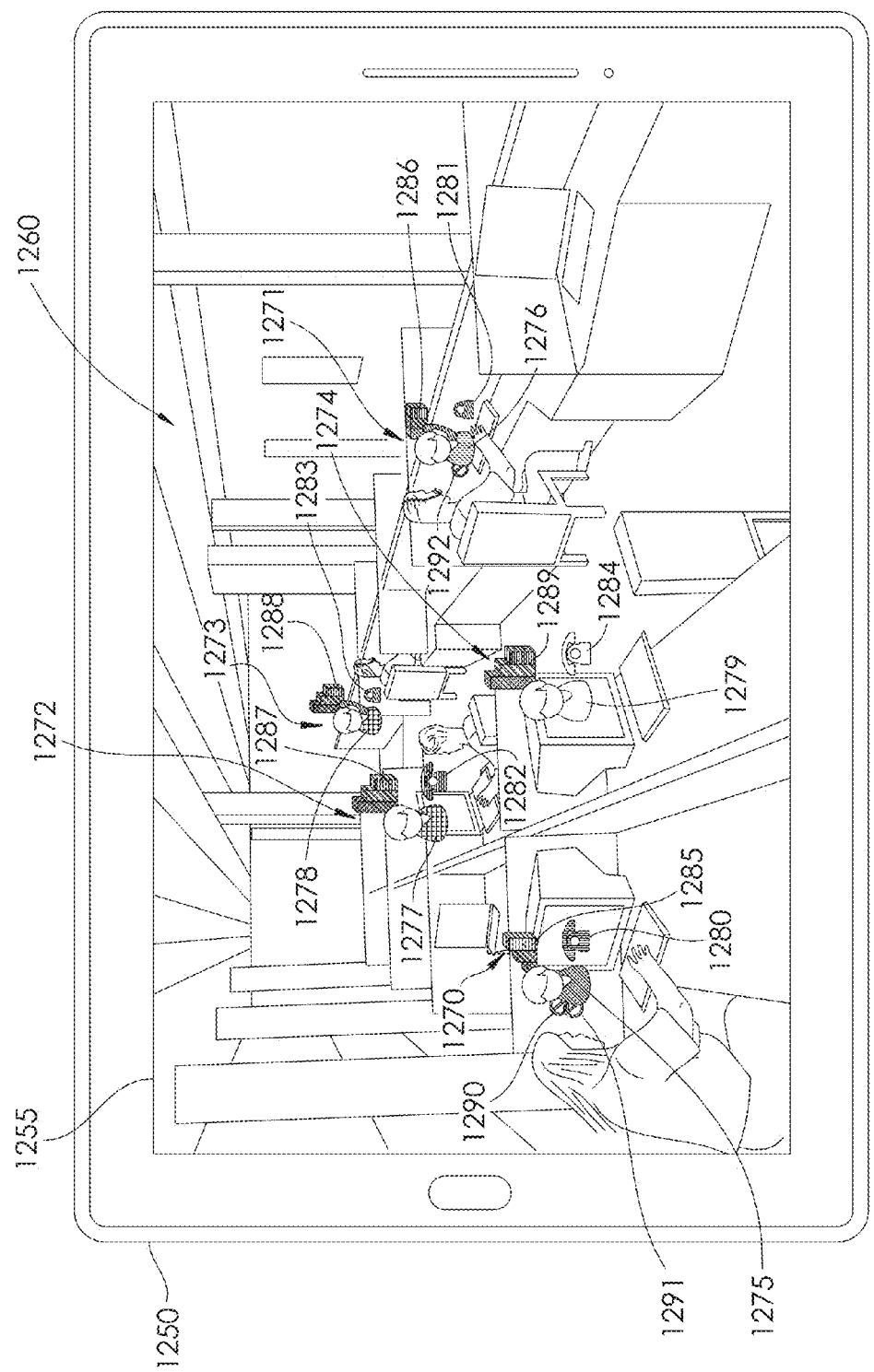
FIG. 25 is a diagram of the display of a mobile device displaying a video feed of a portion of a call center and associated display tiles in accordance with an embodiment of the present invention.

Referring now to FIG. 25, another augmented reality embodiment is illustrated. The display 1255 of a mobile device 1250, such as a tablet or smartphone, is used to display video feed 1260 captured via its onboard camera (not shown). The use of mobile device 1250 is exemplary; any electronic computing device having or in communication with a video recording device and a display may be used. In this illustrative example, the video feed 1260 is of a call center. The objects of interest in the call center are the people—the personnel 1265-1269. The display tiles 1270-1274 are overlaid on the video feed 1260 in the display 1255. The display tile 1270, which provides status information for the object of interest 1265, is positioned in proximity to the object of interest 1265. Likewise, the display tiles 1271-1274, which provide status information for the personnel 1266-1269, respectively, are positioned in proximity to the personnel 1266-1269. The display tiles 1270-1274 together provide a system status for the call center. The position of each of the display tiles 1270-1274 relative to their corresponding personnel 1265-1269 in the video feed 1260 may be based on facial recognition of the personnel 1265-1269. Once the video feed 1260 is received by the mobile device 1250, facial recognition may be run to identify each employee in the video feed 1250. Once personnel 1265-1269 are identified, tiles 1270-1274, are associated therewith. Hard-coded grid coordinates may also be used to determine placement of the display tiles 1270-1274 on the video feed 1260.

Each of the display tiles 1270-1274 includes icons associated with data related to status attributes. As illustrated here, the display tiles 1270-1274 may not have an outline or box that encloses the icons; instead the display tiles 1270-1274 comprise a plurality of icons. In some embodiments, the display tiles may only comprise a single icon. Each of the display tiles 1270-1274 includes an avatar icon 1275-1279, respectively, a phone icon 1280-1284, respectively, and bar graph icon 1285-1289, respectively. One or more of the display tiles 1270-1274 may also have other icons. For example as shown here, the display tile 1270 has the 'no' symbols 1290 and 1291 and display tile 1271 has the 'no' symbol 1292. The avatar icons 1275-1279 have display characteristics based upon received data for their respective personnel 1265-1269 and are indicative of a value of the associated status attribute. For example, the phone icons 1280-1284 indicate if the personnel 1265-1268 are on the phone and whether a caller has been waiting a period of time that exceeds certain thresholds. For example, the icon display characteristics (icon display position and icon color) of phone icons 1281 and 1283 indicate that the personnel 1266 and 1268 are currently on the phone. Not only are a portion of the phone icons 1281 and 1283 positioned near the head of the avatar icons 1276 and 1278, but the phone icons 1281 and 1283 are given a color designated for active calls (such as green, for example). Color is represented in FIG. 25 using hash marks. As shown, the phone icon 1282 has been given a different designated color (such as, yellow, for example). This may be used to indicate that a caller has been waiting a time period that is approaching an unacceptable amount of time. The phone icon 1280 has been given yet another designated color (such as, red, for example). This may be used to indicate that a caller has been waiting a time period that is too long. Bar graphs 1285-1289 may be used to indicate the performance of personnel 1265-1269, respectively. The signs 1290-1292 may be used to indicate the number of caller complaints received about personnel 1265 and 1266 or they may indicate the number of callers that had to wait an unacceptable amount of time before personnel 1265 and 1266 answered the call. Colors, or any other indicators, may also be used on shirts or other portions of avatar icons 1275-1279 to indicate an overall performance rating that takes into account one or more status attributes of the respective personnel 1265-1269.

Figure 26:
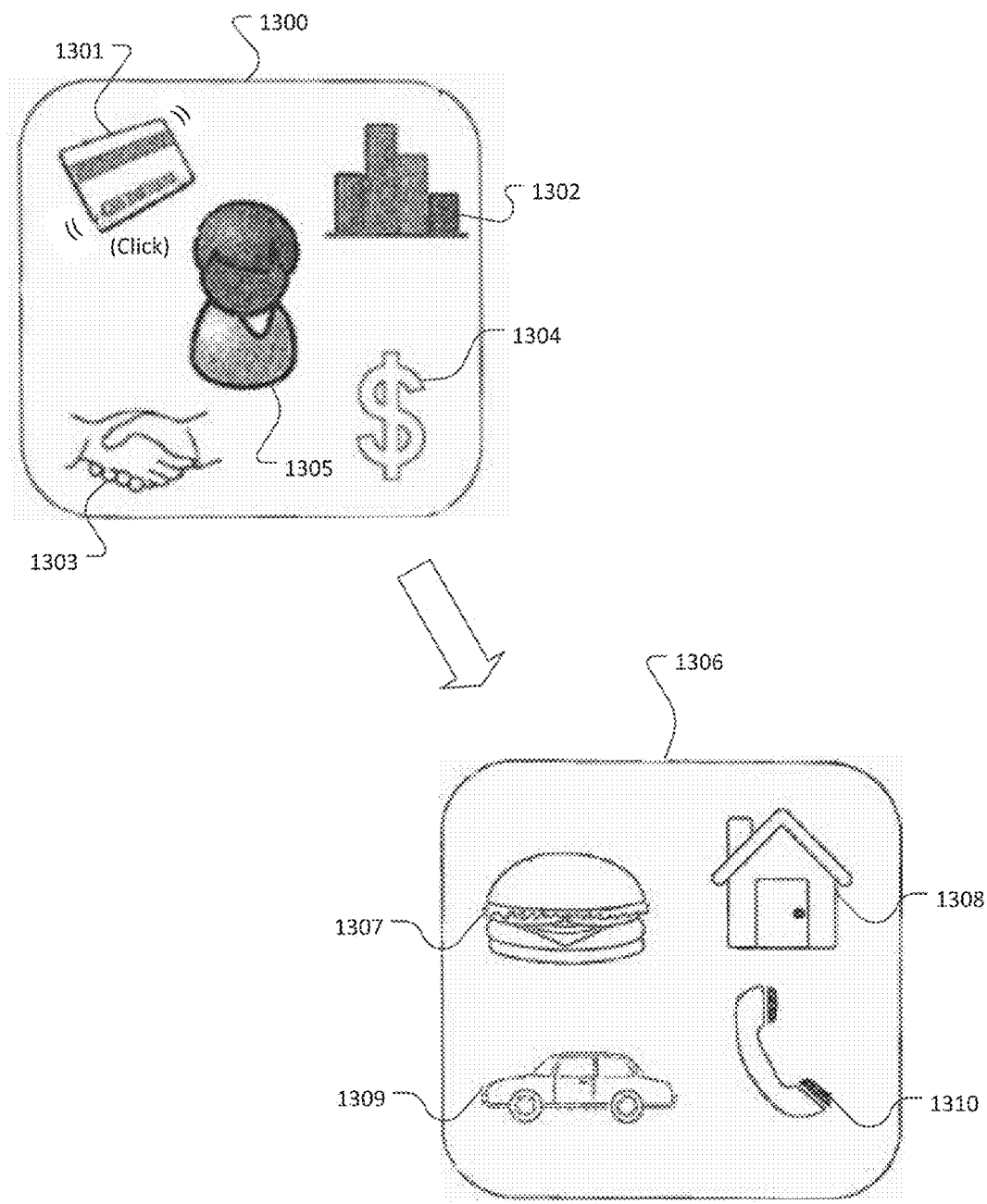
FIG. 26 is a diagram of a first display tile and a secondary display tile that corresponds to an icon of the first display tile in accordance with an embodiment of the present invention.

Referring now to FIG. 26, each display tile may visually display multiple dimensions of data. However, as noted above, it may be desirable for a user to "drill down" to more detailed data or one of the multiple dimensions. In another embodiment, as illustrated in FIG. 26, display tile 1300 comprises icons 1301-1305 which are all user-clickable or selectable. When one of the icons 1301-1305 is selected, more detailed or specific data is displayed that is related to that icon. Since each icon display characteristic is based upon data and indicative of the value of the associated status attribute, by selecting a given icon (e.g. credit card 1301), details of the data contributing to the display characteristics of that icon can be displayed. The detailed data may be displayed via the display tile 1306 as illustrated. In some embodiments, the detailed data may be displayed via another icon (i.e., sub-icon), for example, or a table (i.e. a text report) of the detailed data may be displayed. The detailed data may also be displayed using a mosaic image having a plurality of display tiles, a calendar mosaic (as described below), a timeline mosaic (as described below), a process mosaic (as described below), or any other configuration or compilation of icons and/or display tiles described herein. Other actions may result from selecting one of the icons 1301-1305 in the display tile 1300, for example, launching an application or a website.

Illustratively, the status of a sales person is displayed in the display tile 1300. The display tile 1300 comprises five icons 1301-1305. The credit card icon 1301 is associated with the sales person's expenses. The bar graph icon 1302 is associated with the sales person's historical data and handshake icon 1303 is associated with the sales person's customer base. The money icon 1304 is associated with the sales person's sales, while avatar icon 1305 is associated with the overall status of the sales person. A user may select any of the icons 1301-1305 in the display tile 1300 to obtain more detailed information or data. In particular, if a user selects, via clicking with a mouse pointer, for example, on credit card icon 1301, a display tile 1306 is opened illustrating icons 1307-1310 associated with the expenses. For example, the new display tile 1306 may display the icons 1307-1310 associated with different categories of expenses, for example, meals 1307, travel 1309, lodging 1308, and telephone 1310. Of course, other or additional categories of expenses may be displayed as icons. Similarly, new display tiles may be displayed for each of the other icons 1302-1305, each including icons associated with the corresponding status attribute.

Figure 27:
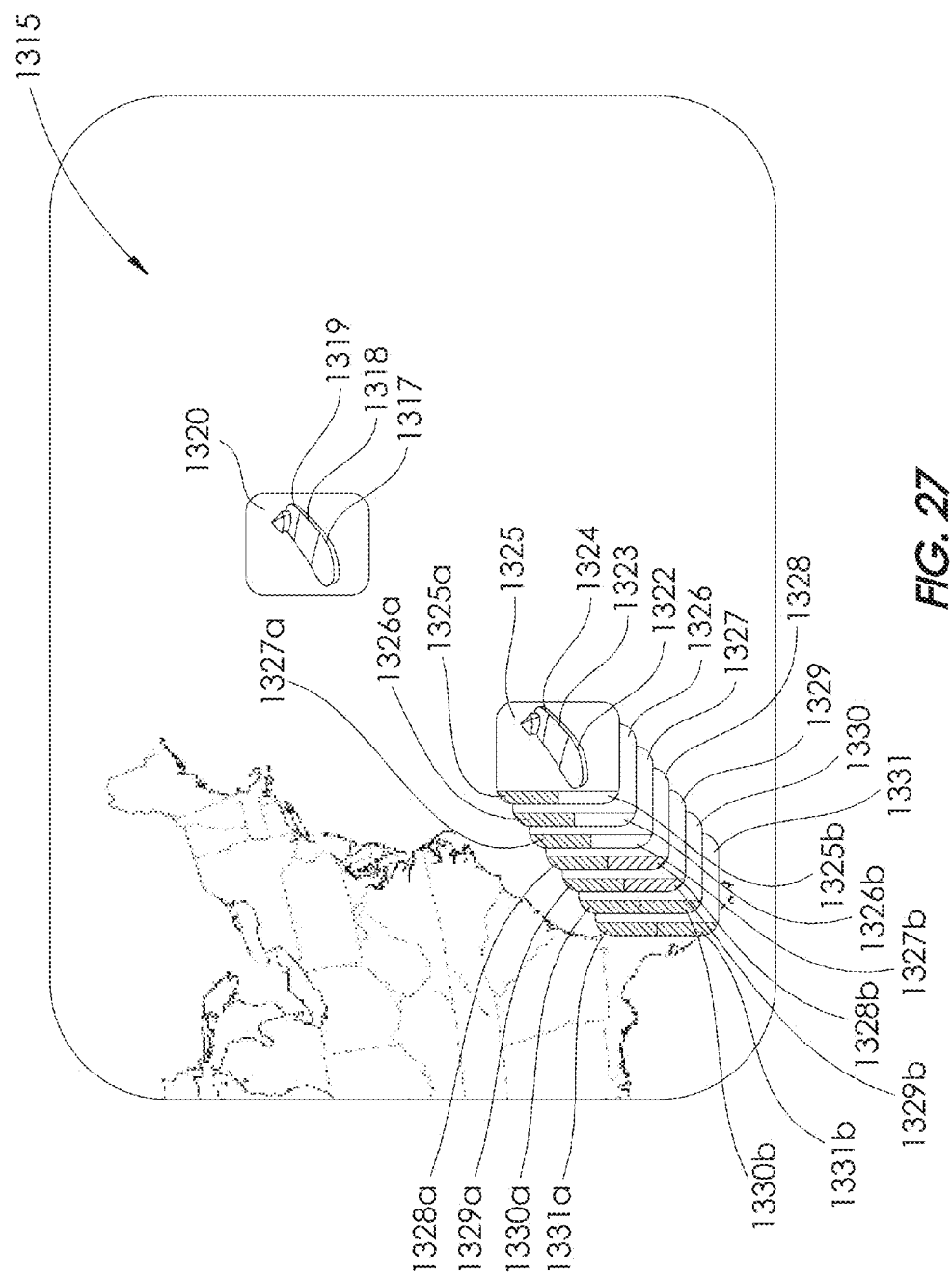
FIG. 27 is a diagram of a display having a map with display tiles geographically positioned thereon in accordance with an embodiment of the present invention.

In embodiments, display tiles associated with respective objects of interest are positioned on a map or other geographic depiction, such as a floorplan or aerial photograph, at a location corresponding to the geographic location of the objects of interest. In the exemplary embodiment shown in FIG. 27, the objects of interest are ships. First display tile 1320, corresponding to a first ship, is positioned at the geographic location of that ship on the map 1315, illustratively in waters off the coast of the northeastern United States. A second display tile 1325, corresponding to a second ship is positioned at the geographic location of that ship on the map 1315, illustratively in waters off the coast of the southeastern United States. The geographic location of each ship may be determined from GPS coordinates, for example. The geographic location may also be obtained based upon other geo-location techniques.

Historical display tiles 1326-1331 may also be used to show the status of an object of interest, here the second ship, over time. Each of historical display tiles 1326-1331 represents the status of the second ship at different geographical locations along its route. At least a portion of each of historical display tiles 1326-1331 may be visible. In this exemplary embodiment, display tile 1325 and historical display tiles 1326-1331 each have bar icons 1325a-1331a and 1325b-1331b on their visible edge that can provide visible status information since display tiles 1326-1331 are partially hidden. Exemplary status attributes that may be reflected by bar icons 1325a-1331a include speed, persons on board at the last check point, and available fuel.

Each of the display tiles 1320, 1325-1331 include icons corresponding to status attributes, as described in detail above. Except for bar icons 1325a-1331a and 1325b-1331b, the icons for display tiles 1326-1331 are not visible unless the display tile is selected by the user in which case it is brought to the foreground and all of its tiles are visible. Stacked and overlapping display tiles, like historical display tiles 1326-1331 are described in further detail below.

Icons 1317-1319 and 1322-1324 are segments of an image of an object of interest, which in this illustration are ships. In other words, each of icon 1317-1319 and each of icons 1322-1324 are part of ship images on display tiles 1320 and 1325, respectively. With the segmented arrangement, the changing display characteristic of each icon gives an appearance that different portions of the ship image in the display tiles 1320 and 1325 are changing. For example, the icon 1318 corresponding to a center portion of the first ship image may be associated with the first ship's cargo, while an icon corresponding to the rear 1319 of the first ship may be associated with the ship's fuel supply. Similarly, the icon 1323 corresponding to a center portion of the second ship image may be associated with the second ship's cargo, while an icon corresponding to the front 1322 of the first ship may be associated with the first ship's anchor status. An image may also be segmented by icons in another fashion to create the image. Also, the display tiles 1320 and 1325 may include other or additional icons, for example, as described above and illustrated in FIGS. 22 and 23. In some embodiments, each image may not be of a corresponding object of interest. Also, icons that are segments of an image may be used in addition to or instead of the icon displays described in other embodiments herein.

Figure 28:
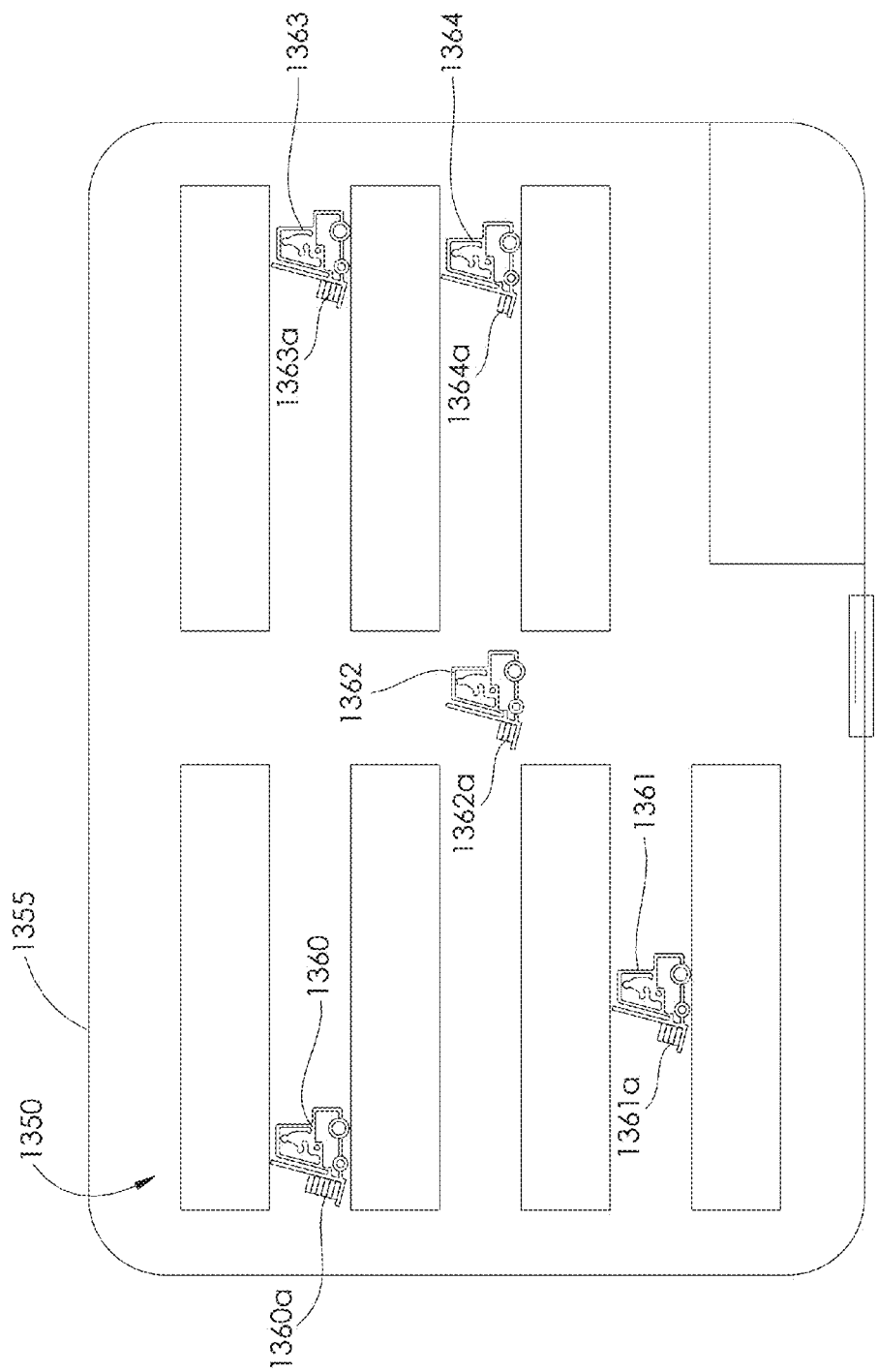
FIG. 28 is a diagram of a display having a diagram of a floorplan with display tiles geographically positioned thereon in accordance with an embodiment of the present invention.

In another embodiment, a display tile associated with an object of interest may be positioned on a floorplan at a geographic location corresponding of the object of interest. In the exemplary embodiment illustrated in FIG. 28, the floorplan 1350 shown on display 1355 is a floorplan of a factory floor having a plurality of forklifts which are the objects of interest represented by display tiles 1360-1364. With respect to each forklift, a user may be interested in the volume of inventory, for example, that each forklift moves during a given day. To reflect this exemplary status attribute, the display tiles 1360-1364 comprise load icons 1360a-1364a that can be increased or decreased in size to visually show the volume of inventory the forklift represented by the respective display tile moved during a given day. Each forklift may transmit its current geographic position as an X, Y coordinate with respect to the factory floor. The display tiles 1360-1364 corresponding to each forklift may be displayed on the floorplan 1350 of the factory with the location of each of display tiles 1360-1364 corresponding to the location of the respective forklift on the factory floor. Pacing the display tiles 1360-1364 on a map or floorplan 1350 at the geographic location of the objects of interest, for example, a user may more quickly obtain a system status as compared to relatively simple or static markers.

Figure 29:
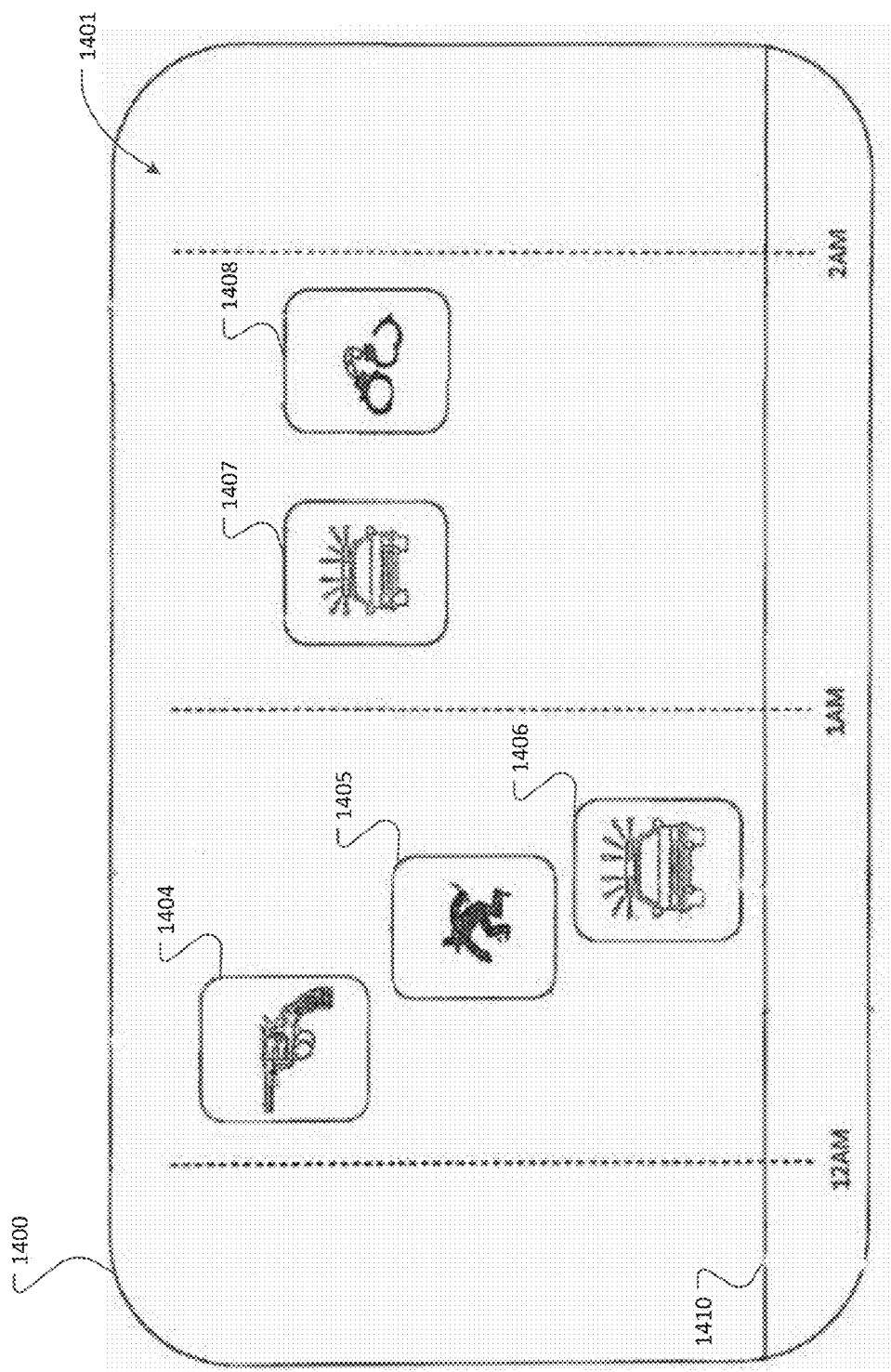
FIG. 29 is a diagram of a display having a timeline with display tiles temporally positioned thereon in accordance with an embodiment of the present invention.

In another embodiment, the display tiles each have time data, such as a timestamp, associated therewith and may be presented visually as a timestamp mosaic. The time data may, for example, be indicative of a time of day of a given event or when the data related to the status attributes is received. As illustrated in FIG. 29, a plurality of display tiles 1404-1408 are displayed on the display 1400 based upon the associated timestamps, for example, along a timeline 1410 to form timeline mosaic 1401. The time data may include date information and timeline 1410 may span one or more days. In other words, trends over time are visually displayed along with the status of a given object of interest. The display tiles in a given timeline mosaic may represent a series of events including multiple objects of interest as shown in FIG. 29. Here, two display tiles 1406 and 1407 represent the status of the same types of events of interest at different times (or the same event at different times), while display tiles 1404, 1405, and 1408 represent different types of events of interest. Alternatively, the display tiles may represent the status of a single object of interest at different times. For example, using the call center example described above, a timeline mosaic for a call center employee may include a plurality of display tiles all representing the status of that employee at different times throughout a day or any given time period. In other alternative embodiments, the display tiles may represent the status of multiple objects of interest over a given time period. Continuing with the call center example, the status of multiple employees, each represented by one or more time-stamped display tiles, may be presented on a single timeline over a given period of time.

Figure 30:
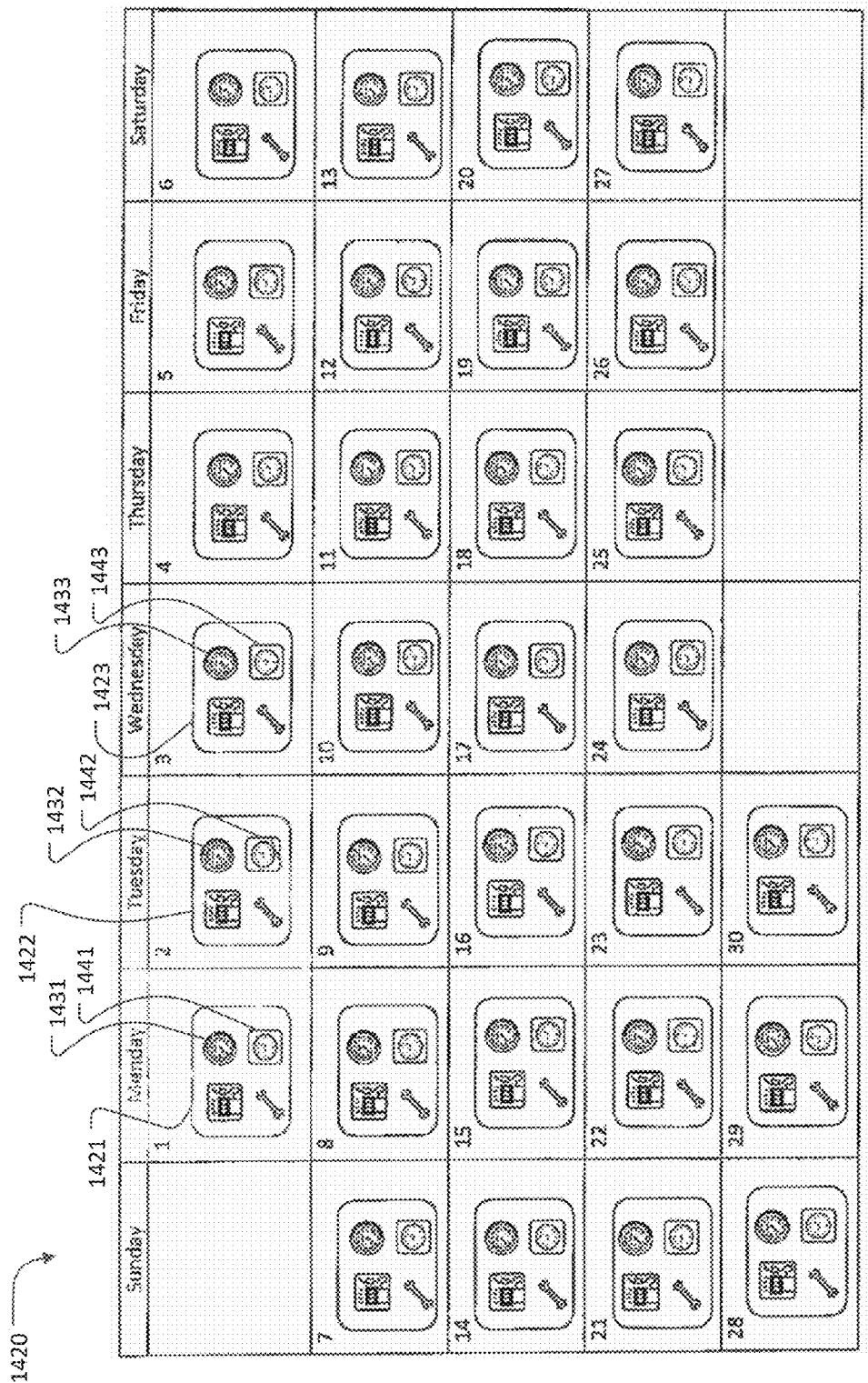
FIG. 30 is a diagram of a calendar having display tiles corresponding to the status of an object of interest for each day in the calendar in accordance with an embodiment of the present invention.

Referring now to FIG. 30, in yet another embodiment, the display tiles (e.g. 1421-1423) are combined into a calendar mosaic 1420. Similar to the embodiment described above, the display tiles (e.g. 1421-1423) are arranged into the calendar mosaic 1420 by time, and more particularly, in a grid format matching a monthly calendar. Although a monthly calendar format is shown here, the calendar mosaic 1420 may be configured in other temporal formats. By displaying the display tiles (e.g. 1421-1423) in a calendar mosaic 1420, a user may quickly recognize regular patterns that are based upon days of the week, month, and/or year. For example, with respect to the example of the fleet vehicle, the calendar mosaic 1420 may more readily indicate that the fleet vehicle's idle time and speed, indicated by speed icons (e.g. 1431-1433) and idle time icons (e.g. 1441-1443), respectively, are increased on Mondays and Fridays. In another example, with respect to a salesperson's performance, a calendar mosaic may more readily indicate that the salesperson perform better on Tuesdays and Fridays compared to other days in the week. As described above, each display tile (e.g. 1421-1423) may be selected to be enlarged on the display, or may be selected for further details and/or data.

Figure 31:
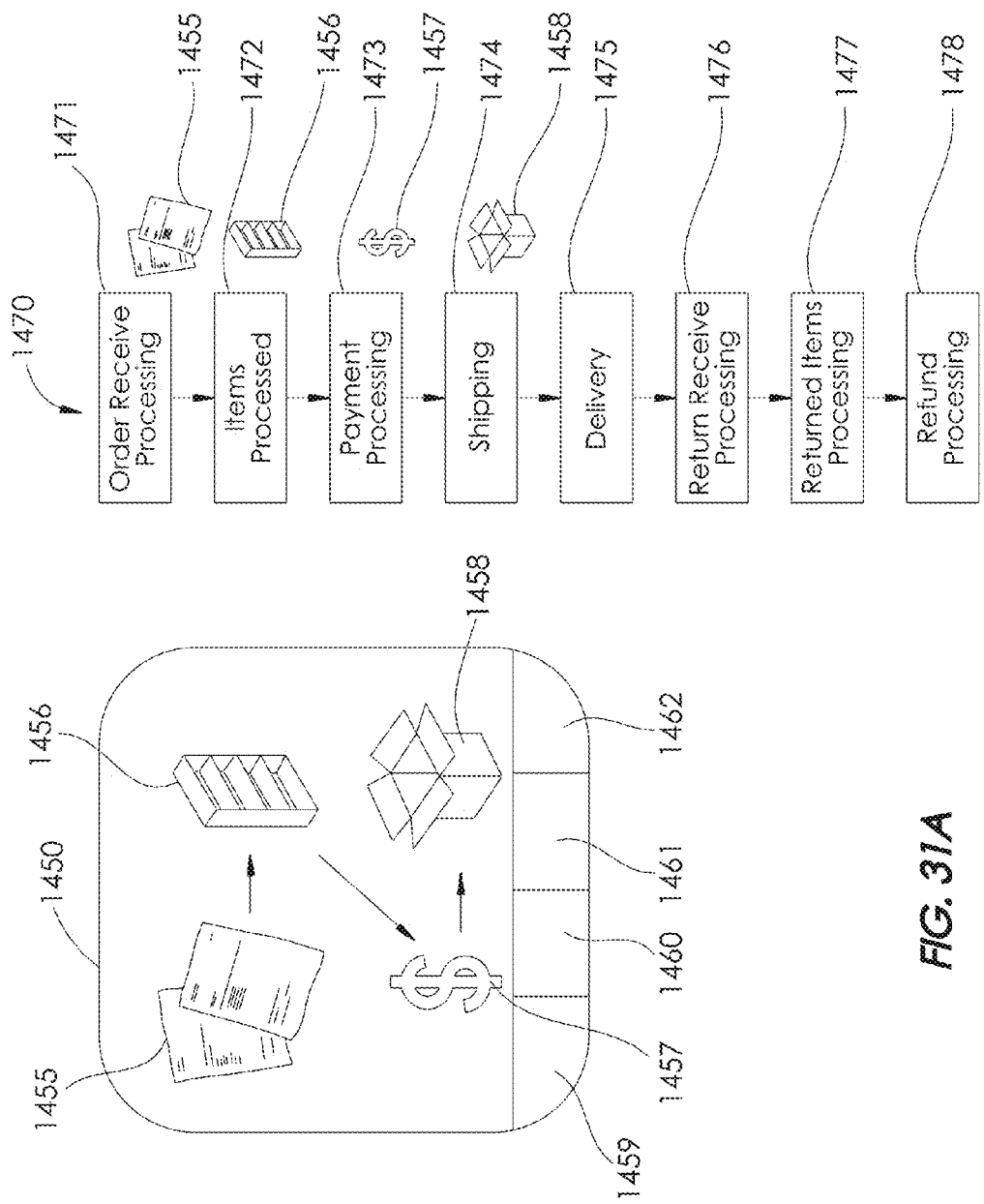
FIGS. 31A and 31B are diagrams of a display tile (FIG. 31A) and a flowchart (FIG. 31B) with icons from the display tile corresponding to the operations of the process presented in the flowchart in accordance with an embodiment of the present invention.

In yet another embodiment, the icons of each display tile may be associated with different events, phases, steps, and/or tasks (hereinafter referred to as "operations") of a company/industry specific process (i.e., the status attributes). Referring to FIGS. 31A and 31B, a process display tile 1450 comprises a plurality of icons 1455-1458. The icons 1455-1458 correspond to operations in the flowchart 1470. For example, for online item purchase processing, the first icon 1455, illustratively a pair of forms or invoices, from the display tile 1450 may be associated with the order receive processing operation 1471 in flowchart 1470 and the second icon 1456, a shelf, from the display tile 1450 may be associated with the operation of order items being processed for shipping 1472. The third icon 1457, a dollar sign, from the display tile 1450 may be associated with payment processing operation 1473 and a fourth icon 1458, a shipping box, from the display tile 1450 may be associated with shipping operation 1474. Although four icons are used in this exemplary embodiment, other or additional icons may be used in connection with a process display tile. The process display tile 1450 provides a real-time visual status of the process, and more particularly, the status at each step. In other words, by spreading the icons 1455-1458 across a process display tile 1450 and changing the icon display characteristics, a user can obtain real time or near real time performance metrics, which may be used for planning, for example.

If the process being represented by a process display tile has a large number of steps or if it desirable to only have visible as icons a limited number of operations, tab icons can be used to represent the additional operations. As illustrated in FIGS. 31A and 31B, process display tile 1450 comprises tab icons 1459-1462. The first tab icon 1459 may be associated with the delivery operation 1475, the second tab icon 1460 may be associated with the operation of return receive processing 1476, the third tab icon 1461 may be associated with the returned items processing operation 1477, and the fourth icon 1462 may be associated with the refund processing operation 1478. Like other icons described herein, tab icons 1459-1462 comprise icon display characteristics such as icon display color, icon display pattern (e.g. hash marks, grid marks, dots), icon display size, icon display shape, or an icon display position. For example, each of tab icons 1459-1462 may be colored purple to indicate that the operation has not occurred, then may be colored orange once the operation is in process and then may be colored yellow once the operation is complete. Similarly, like other icons described herein, the tab icons 1459-1462 may be selected to be enlarged on the display, or may be selected for further details and/or data. Although the tab icons 1459-1462 shown here are rectangular or near-rectangular in shape, any shape and/or size can be used. In some embodiments, all icons in a process display tile may be tab icons.

Figure 32:
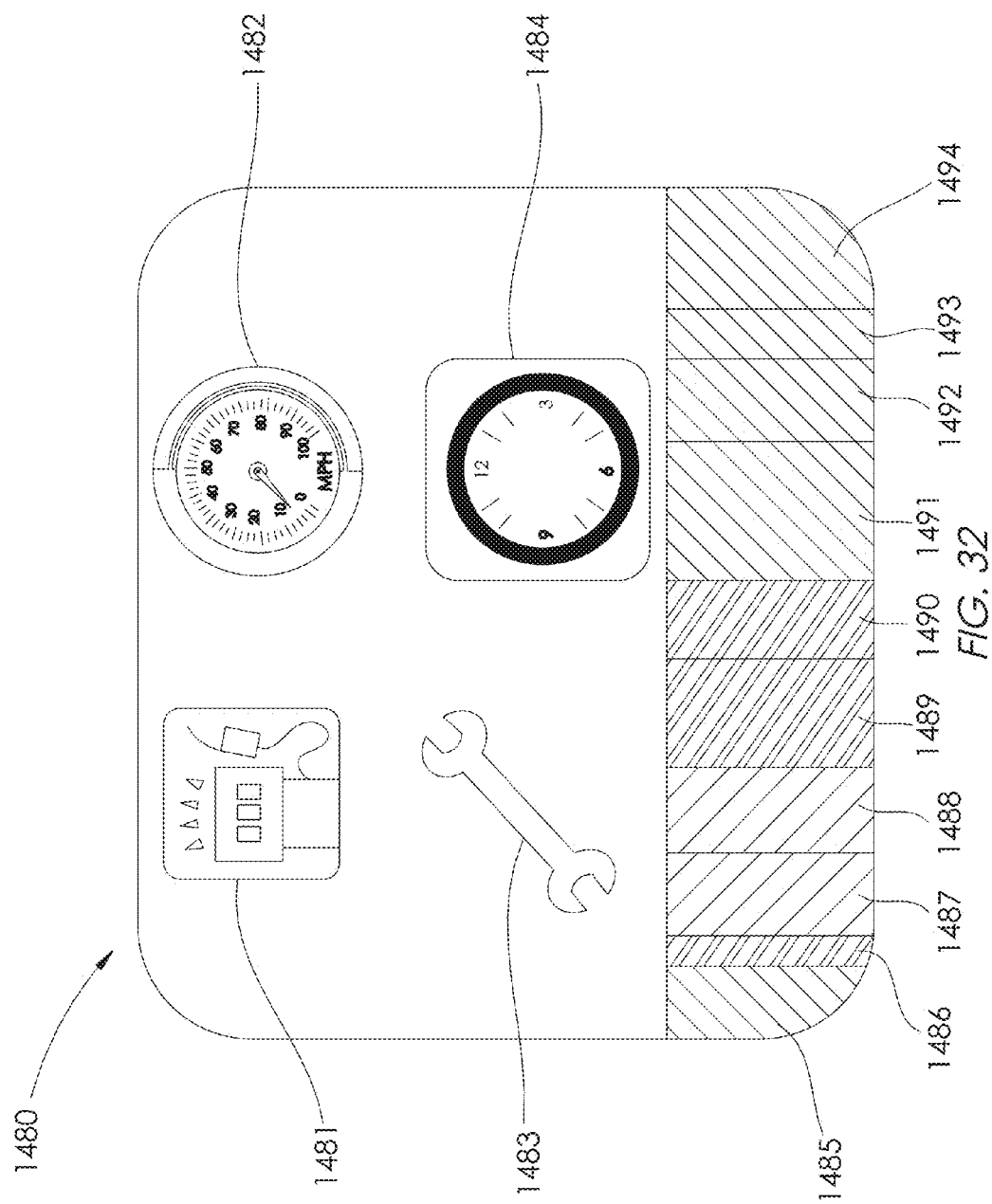
FIG. 32 is a diagram of a display tile comprising icons including tab icons in accordance with an embodiment of the present invention.

In an additional embodiment, both a process of interest and an object of interest can be represented by the same display tile. An exemplary embodiment utilizing a display tile to present both a process of interest and an object of interest is shown in FIG. 32. This embodiment employs the example of a fleet vehicle as the object of interest as described above. Like previously presented examples, display tile 1480 comprises fuel pump icon 1481 indicating the status of the fuel level of the fleet vehicle, speedometer icon 1482 indicating the speed of the fleet vehicle, wrench icon 1483 indicating the maintenance status of the fleet vehicle, and clock icon 1484 indicating the idle time of the fleet vehicle. The process of interest, which in this example is the day-long journey of the fleet vehicle comprising ten stops, is represented by ten tab icons 1485-1494. The first through tenth stops are represented by tab icons 1485-1494, respectively. The tab icons 1485-1494 can be used to indicate one or more status attributes at or between the stops. For example, the tab icons 1485-1494 can be used to indicate if the fleet vehicle arrived early, late, on time and can also be used to indicate how early the fleet vehicle arrived or the severity of tardiness. Although any icon display characteristic can be used, color (represented by hash marks) is used in this example. Thresholds for the windows of time for each stop are set. For example, for the first stop, if the fleet vehicle arrived between 5:15 am and 5:30 am, it would be considered on time and would be assigned a color designated for early arrival. Here, blue (represented by horizontal hash marks) will be used. If it arrived any time prior to 5:15 am, then it would be considered early and would be assigned a different color (or different shade of the same color) designated for on-time arrival. Here, green (represented by upward slanting hash marks) will be used. If the fleet vehicle arrived any time after 5:30 am, then it would be considered late and would be assigned a different color (or different shade of the same color) designated for late arrival. Here, red (represented by downward slanting has marks) will be used. Other thresholds can be set and assigned other colors (or various color shades) to indicate the how early or how late the fleet vehicle was. With respect to the fleet vehicle represented by example display tile 1480, it was early to stops 1, 7, 8, 9, and 10, represented by the tab icons 1485 and 1491-1494, respectively, on time to stops 2, 5, and 6 represented by the tab icons 1486, 1489, and 1490, respectively, and late to stops 3 and 4 represented by tab icons 1487 and 1488.

Display tile 1480, like all other display tiles, including process display tiles, described herein, can be combined with other display tiles to form any of the mosaics described herein.

Figure 33:
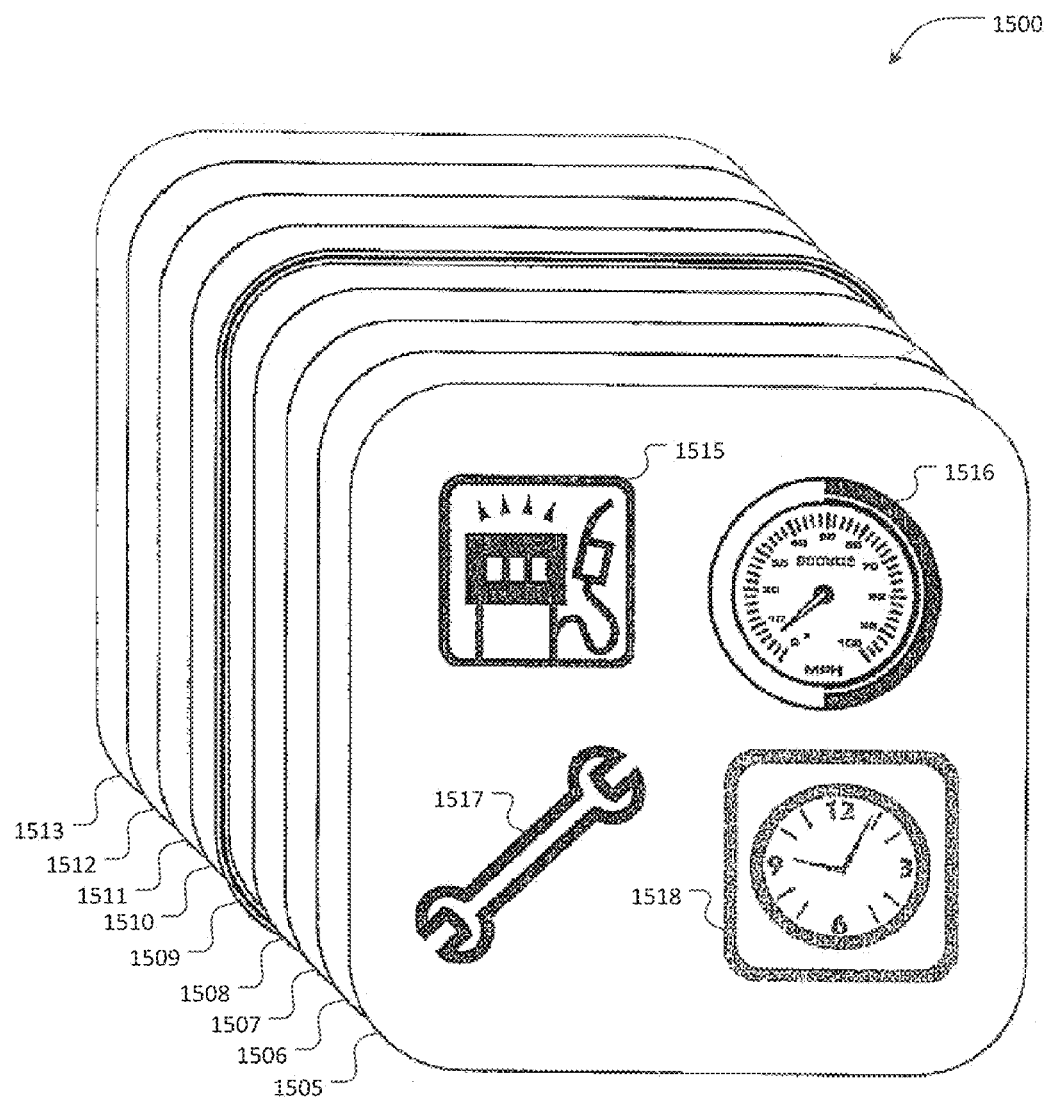
FIG. 33 is a diagram of stacked display tiles in accordance with an embodiment of the present invention.

In a further embodiment, the display tiles may be displayed in stacked and overlapping relation. As illustrated in the exemplary embodiment shown in FIG. 33, the display tiles 1505-1513 are illustratively stacked so that the left and top side portions of each of the display tiles 1505-1513 remain visible or exposed. In other words, the top display tile 1505 obscures the lower display tiles 1506-1513 but for the exposed portions. A mosaic image may include multiple rows or columns of the stacked display tiles 1500. The visible portion of each of the display tiles 1505-1513 may comprise an icon display characteristic of a given icon of the respective display tile (i.e., certain metrics), or may be a display characteristic of combined icon display characteristics (i.e., an "overall score"). For example, an exposed or visible portion of the display tile may be a combined icon display characteristic from the fuel level icon 1515, the speed icon 1516, the idle time icon 1518, and the maintenance history icon 1517. Illustratively, the display tile 1509 has a different display characteristic for relatively easy identification such as a red color band. The stacking of the display tiles 1505-1513 permits the display of an increased amount of display tiles on a display as compared to a side-by-side mosaic image. One or more display tiles out of thousands, for example, may be more quickly identified as outliers or having an undesired status using stacked display tiles.

Additionally, the visible portion may be user defined. More particularly, when the exposed portion of each display tile in the stack is indicative of an overall score or status for the corresponding object of interest, the user may select or deselect which icons are to be included as part of the overall status. In other words, the user may determine which status attributes contribute to the overall status displayed on the visible portion of each display tile. Additionally, the user may bring a lower tile to the top of the stack by, for example, selecting or clicking, the exposed side of the display tile to make the entire display tile visible.

Figure 34A:
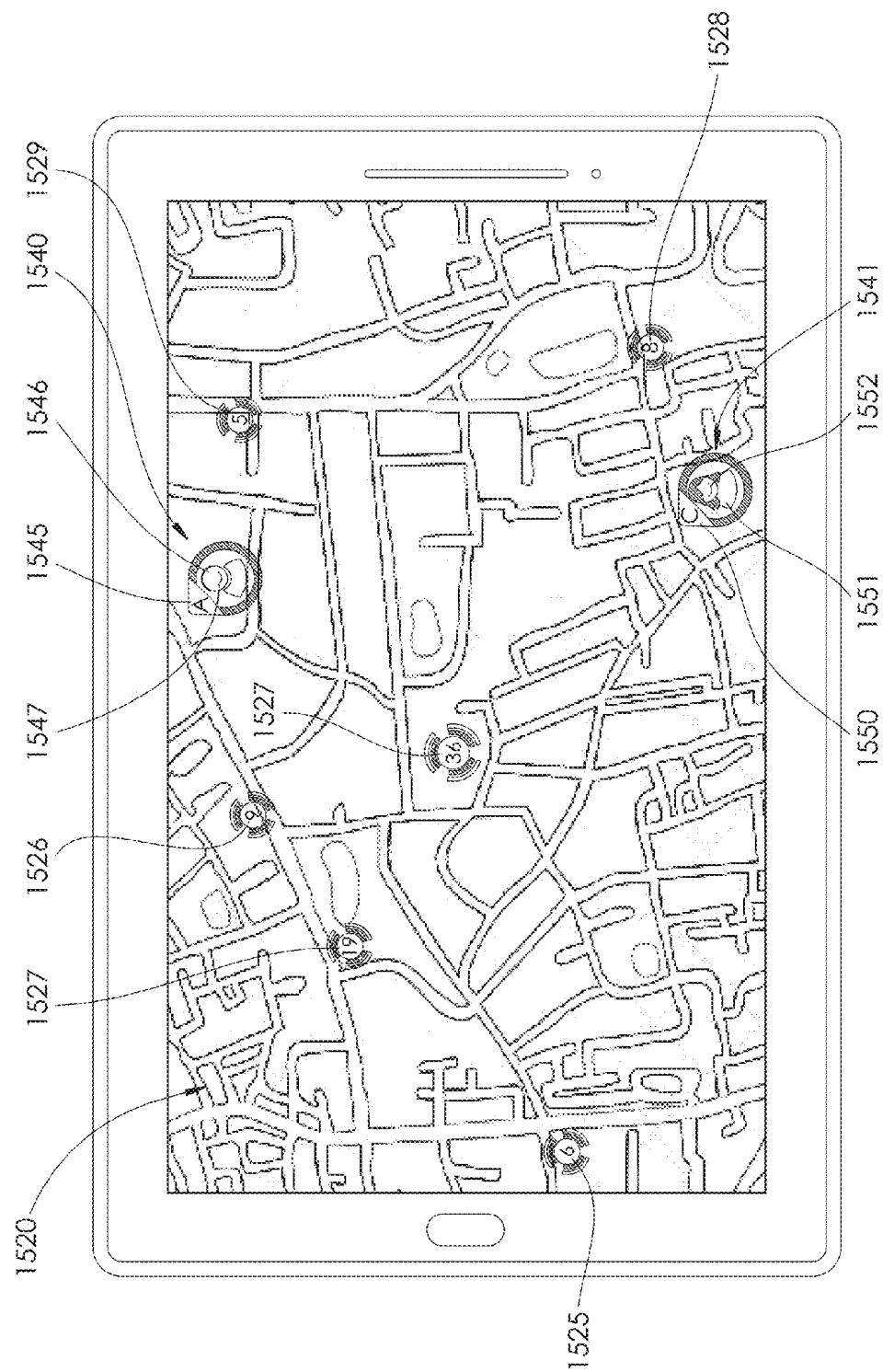
FIG. 34A is a diagram of the display of a mobile device displaying a map having a plurality of composite display tiles according to an embodiment of the present invention.

In a yet further embodiment, a plurality of display tiles may be represented by a single display tile, icon, or other indicator. In the exemplary embodiment shown in FIGS. 34A and 34B, the objects of interest are students. FIG. 34A, shows a map 1520 having a plurality of display tiles 1540 and 1541 and a plurality of composite indicators 1525-1529. The exemplary display tiles 1540 and 1541 represent two students and provide status information on the students such as his/her current grade in a class given by grade icons 1545 and 1550, his/her sex given by avatar icons 1546 (male—without hair) and 1551 (female—with hair), and his/her current satisfaction with the class given by lip icons 1547 and 1552. Each of the composite indicators 1525-1529 represent a plurality of display tiles. The number of display tiles represented by a given indicator may be displayed on the indicator, as shown in FIG. 34A. For example composite indicator 1525 represents six display tiles and composite indicator 1527 represents nineteen display tiles. When a composite indicator is selected, the display tiles the composite indicator represents may be displayed. For example, when composite indicator 1527 is selected, a plurality of display tiles (e.g. display tiles 1560-1562) are displayed. Although a spiral, partially overlapping design is shown in FIG. 34B, any design and/or degree of overlap may be used. In this manner, large numbers of objects of interest can be displayed in a limited space. In alternative embodiments, each indicator may be, for example, a display tile, or composite display tile. The composite display tile provides selected or overall status information for the display tiles it represents.

In embodiments, a user selectable slider or other threshold manipulation tool is provided that allows the user to visually view the received data and set moveable ranges based thereon. In an exemplary embodiment illustrated in FIG. 35, a pair of manipulation sliders 1605 and 1606 are displayed on a display 1600 over a histogram of a data distribution of the received data for a given status attribute 1610. In other words, the manipulation sliders 1605 and 1606 are slideably adjusted to a desired threshold that corresponds to an icon display characteristic, for example, color, for a given icon. More particularly, in the example of color as the icon display characteristic, the user may visually set the data thresholds so that the icon color changes based upon the set thresholds in the displayed histogram. This may be particularly advantageous for more intelligently setting threshold levels, rather than setting the threshold levels to an arbitrary value. In this example, the display characteristic for an icon are set by manipulation sliders 1605 and 1606. Three different icon display characteristics are used, which are represented by icon display characteristics 1615a, 1615b, and 1615c. Icon display characteristic 1615a, which will represent all data that falls to the left of manipulation slider 1605, will have a first icon display characteristic (e.g. purple), icon display characteristic 1616, which will represent all data that falls in between manipulation sliders 1605 and 1606, will have a second icon display characteristic (e.g. yellow), and icon display characteristic 1617, which will represent all data that falls to the right of manipulation slider 1606, will have a third icon display characteristic (e.g. orange). Additional manipulation sliders may be used for additional icon display characteristics. Although a histogram is shown and described, any diagram representing the received data can be used.

A method aspect is directed to a method of displaying a system status for a plurality of objects of interest. The method includes receiving data related to a plurality of status attributes for each object of interest. Each status attribute having an icon associated therewith. The method also includes determining an icon display characteristic for each icon based upon the received data and indicative of a value of the associated status attribute, and generating a respective display tile for each object of interest by combining respective icons so that each icon with its icon display characteristic remains visible. The method further includes combining the display tiles into a mosaic image representative of the system status; and displaying the mosaic image on a display.

While many embodiments have been described herein, it will be appreciated by those skilled in the art, that any of the embodiments may be used in conjunction with each other. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included.

What is claimed is:

1. A method of displaying a status of an object of interest in an augmented reality environment comprising:
   receiving a live video feed including an object of interest, wherein said live video feed is generated by a video camera;
   receiving data related to a plurality of status attributes for the object of interest, each status attribute having an icon associated therewith conveying meaning through a pictorial resemblance of the object of interest;
   determining an icon display characteristic for each icon based upon the received data and indicative of a value of the associated status attribute;
   generating a display tile for the object of interest by combining the icons so that at least a portion of each icon with its icon display characteristic remains visible;
   combining the live video feed and the display tile into a combined live video feed representative of the status of the object of interest; and displaying the combined live video feed on a display.

2. The method of claim 1, further comprising:
   determining the identification of the object of interest in the live video feed.

3. The method of claim 2, wherein the identification of the object of interest in the live video feed is determined using video analysis.

4. The method of claim 2, wherein the identification of the object of interest in the live video feed is determined using facial recognition.

5. The method of claim 2, wherein the identification of the object of interest in the live video feed is determined using position coordinates.

6. The method of claim 1, wherein combining the live video feed and the display tile into the combined live video feed comprises overlaying the display tile on the live video feed.

7. The method of claim 1, further comprising:
updating a given icon display characteristic based upon a change in received data.

8. The method of claim 1, further comprising:
updating a given icon display characteristic based upon the value exceeding a threshold.

9. The method of claim 1, wherein the icon display characteristic comprises an icon display color.

10. The method of claim 1, wherein the icon display characteristic comprises an icon display size.

11. The method of claim 1, wherein the icon display characteristic comprises an icon display shape.

12. The method of claim 1, wherein the icon display characteristic comprises an icon display position.

13. The method of claim 1, wherein the received data comprises data received in real-time.

14. The method of claim 1, wherein the received data comprises data received from multiple sources.

15. A method of displaying a status of an object of interest in an augmented reality environment comprising:
receiving a live video feed including an object of interest, wherein said live video feed is generated by a video camera;
receiving data related to a plurality of status attributes for the object of interest, each status attribute having an icon associated therewith conveying meaning through a pictorial resemblance of the object of interest;
determining an icon display characteristic for each icon based upon the received data and indicative of a value of the associated status attribute;
generating a plurality of virtual image layers, each virtual image layer associated with a respective determined icon display characteristic;
generating a display tile for the object of interest by combining the plurality of virtual image layers;
combining the live video feed and the display tile into a combined live video feed representative of the status of the object of interest; and displaying the combined live video feed on a display.

16. The method of claim 15, further comprising:
determining the identification of the object of interest in the live video feed.

17. The method of claim 15, wherein the identification of the object of interest in the live video feed is determined using video analysis.

18. The method of claim 15, wherein the identification of the object of interest in the live video feed is determined using facial recognition.

19. The method of claim 15, wherein the identification of the object of interest in the live video feed is determined using position coordinates.

20. The method of claim 15, wherein combining the live video feed and the display tile into the combined live video feed comprises overlaying the display tile on the live video feed.

21. The method of claim 15, further comprising:
updating a given icon display characteristic based upon a change in received data.

22. The method of claim 15, further comprising:
updating a given icon display characteristic based upon the value exceeding a threshold.

23. The method of claim 15, wherein the icon display characteristic comprises an icon display color.

24. The method of claim 15, wherein the icon display characteristic comprises an icon display size.

25. The method of claim 15, wherein the icon display characteristic comprises an icon display shape.

26. The method of claim 15, wherein the icon display characteristic comprises an icon display position.

27. The method of claim 15, wherein the received data comprises received in real-time.

28. The method of claim 15, wherein the received data comprises data received from multiple sources.

29. A system for displaying a status of an object of interest in an augmented reality environment comprising:
a processor in electrical communication with a memory, wherein the memory comprises computer readable non-transitory memory comprising computer readable instructions for execution by the processor that cause the system to perform the operations of
receiving a live video feed including an object of interest, wherein said live video feed is generated by a video camera,
receiving data related to a plurality of status attributes for the object of interest, each status attribute having an icon associated therewith conveying meaning through a pictorial resemblance of the object of interest,
determining an icon display characteristic for each icon based upon the received data and indicative of a value of the associated status attribute,
generating a display tile for the object of interest by combining the icons so that at least a portion of each icon with its icon display characteristic remains visible,
combining the live video feed and the display tile into a combined live video feed representative of the status of the object of interest, and
displaying the combined live video feed on a display.

30. The system of claim 29, wherein the computer readable instructions further cause the system to perform the operation of determining the identification of the object of interest in the live video feed.

31. The system of claim 29, further comprising:
updating a given icon display characteristic based upon a change in received data.

32. A system for displaying a status of an object of interest comprising in an augmented reality environment:
an electronic device having a display, a camera, and a processor in electrical communication with a memory, wherein the memory comprises computer readable non-transitory memory comprising computer readable instructions for execution by the processor that cause the system to perform the operations of
receiving a live video feed from the camera including an object of interest, wherein said live video feed is generated by a video camera,
receiving data related to a plurality of status attributes for the object of interest, each status attribute having an icon associated therewith conveying meaning through a pictorial resemblance of the object of interest, determining an icon display characteristic for each icon based upon the received data and indicative of a value of the associated status attribute, generating a display tile for the object of interest by combining the icons so that at least a portion of each icon with its icon display characteristic remains visible, combining the live video feed and the display tile into a combined live video feed representative of the status of the object of interest, and displaying the combined live video feed on the display.

33. The system of claim 32, wherein the computer readable instructions further cause the system to perform the operation of determining the identification of the object of interest in the live video feed.

34. The system of claim 32, further comprising:
updating a given icon display characteristic based upon a change in received data.

35. A system for displaying a status of an object of interest comprising in an augmented reality environment:
a server having a processor in electric communication with a memory comprising computer readable non-transitory memory comprising computer readable instructions for execution by the processor; a camera in communication with the server;
a display in communication with the server; and
wherein the computer readable instructions cause the system to perform the operations of
receiving a live video feed from the camera including an object of interest,
receiving data related to a plurality of status attributes for the object of interest, each status attribute having an icon associated therewith conveying meaning through a pictorial resemblance of the object of interest,
determining an icon display characteristic for each icon based upon the received data and indicative of a value of the associated status attribute,
generating a display tile for the object of interest by combining the icons so that at least a portion of each icon with its icon display characteristic remains visible,
combining the live video feed and the display tile into a combined live video feed representative of the status of the object of interest, and
displaying the combined live video feed on the display.

36. The system of claim 35, wherein the computer readable instructions further cause the system to perform the operation of determining the identification of the object of interest in the live video feed.

37. The system of claim 35, further comprising:
updating a given icon display characteristic based upon a change in received data.

38. A method of displaying a status of an object of interest comprising:
receiving data related to a plurality of status attributes for an object of interest, each status attribute having an icon associated therewith conveying meaning through a pictorial resemblance of the object of interest;
determining an icon display characteristic for each icon based upon the received data and indicative of a value of the associated status attribute;
generating a display tile for the object of interest by combining the icons so that at least a portion of each icon with its icon display characteristic remains visible;
displaying the display tile on a display;
receiving a user selection of one of the icons;
generating a secondary display tile based upon the user-selected icon by combining a plurality of secondary icons associated with the status attribute of the user-selected icon; and
displaying the secondary display tile on the display.

39. A system for displaying a status of an object of interest comprising:
a processor in electrical communication with a memory, wherein the memory comprises computer readable non-transitory memory comprising computer readable instructions for execution by the processor that cause the system to perform the operations of
receiving data related to a plurality of status attributes for an object of interest, each status attribute having an icon associated therewith conveying meaning through a pictorial resemblance of the object of interest,
determining an icon display characteristic for each icon based upon the received data and indicative of a value of the associated status attribute,
generating a display tile for the object of interest by combining the icons so that at least a portion of each icon with its icon display characteristic remains visible,
displaying the display tile on a display,
receiving a user selection of one of the icons,
generating a secondary display tile based upon the user-selected icon by combining a plurality of secondary icons associated with the status attribute of the user-selected icon, and
displaying the secondary display tile on the display.

40. A method of displaying a status of an object of interest comprising:
receiving a position of an object of interest;
receiving data related to a plurality of status attributes for the object of interest, each status attribute having an icon associated therewith conveying meaning through a pictorial resemblance of the object of interest;
determining an icon display characteristic for each icon based upon the received data and indicative of a value of the associated status attribute;
generating a display tile for the object of interest by combining the icons so that at least a portion of each icon with its icon display characteristic remains visible;
combining the display tile and a geographic depiction of an area comprising the position, wherein the display tile is positioned on the geographic depiction at a location representative of the position; and
displaying the combined display tile and geographic depiction on a display.

41. The method of claim 40, wherein each icon may be a segment of a composite icon.

42. The method of claim 41, wherein the composite icon may graphically represent the object of interest.

43. The method of claim 40, wherein the geographic depiction is a map.

44. The method of claim 40, wherein the geographic depiction is a floorplan.

45. A system for displaying a status of an object of interest comprising:
a processor in electrical communication with a memory, wherein the memory comprises computer readable non-transitory memory comprising computer readable instructions for execution by the processor that cause the system to perform the operations of
receiving a position of an object of interest,
receiving data related to a plurality of status attributes for the object of interest, each status attribute having an icon associated therewith conveying meaning through a pictorial resemblance of the object of interest, determining an icon display characteristic for each icon based upon the received data and indicative of a value of the associated status attribute, generating a display tile for the object of interest by combining the icons so that at least a portion of each icon with its icon display characteristic remains visible, combining the display tile and a geographic depiction of an area comprising the position, wherein the display tile is positioned on the geographic depiction at a location representative of the position, and displaying the combined display tile and geographic depiction on a display.

46. The system of claim 45, wherein each icon may be a segment of a composite icon.

47. The system of claim 46, wherein the composite icon may graphically represent the object of interest.

48. The system of claim 45, wherein the geographic depiction is a map.

49. The system of claim 45, wherein the geographic depiction is a floorplan.

50. A method of displaying a status of an object of interest comprising:

receiving data related to a plurality of status attributes for an object of interest, each status attribute having an icon associated therewith conveying meaning through a pictorial resemblance of the object of interest;

determining an icon display characteristic for each icon based upon the received data and indicative of a value of the associated status attribute;

generating a display tile for the object of interest by combining the icons so that at least a portion of each icon with its icon display characteristic remains visible, wherein the display tile has a timestamp associated therewith;

generating a timeline mosaic comprising a timeline comprising the time reflected in the timestamp and the display tile, wherein the display tile is positioned along the timeline at a location representative of the time reflected in the timestamp; and displaying the timeline mosaic on a display.

51. A system for displaying a status of an object of interest comprising:

a processor in electrical communication with a memory, wherein the memory comprises computer readable non-transitory memory comprising computer readable instructions for execution by the processor that cause the system to perform the operations of receiving data related to a plurality of status attributes for an object of interest, each status attribute having an icon associated therewith conveying meaning through a pictorial resemblance of the object of interest, determining an icon display characteristic for each icon based upon the received data and indicative of a value of the associated status attribute, generating a display tile for the object of interest by combining the icons so that at least a portion of each icon with its icon display characteristic remains visible, wherein the display tile has a timestamp associated therewith, generating a timeline mosaic comprising a timeline comprising the time reflected in the timestamp and the display tile, wherein the display tile is positioned along the timeline at a location representative of the time reflected in the timestamp, and displaying the timeline mosaic on a display.

52. A method of displaying a status of an object of interest comprising:

receiving data related to a plurality of status attributes for an object of interest, each status attribute having an icon associated therewith conveying meaning through a pictorial resemblance of the object of interest;

determining an icon display characteristic for each icon based upon the received data and indicative of a value of the associated status attribute;

generating a display tile for the object of interest by combining the icons so that at least a portion of each icon with its icon display characteristic remains visible, wherein the display tile has a date associated therewith;

generating a calendar mosaic comprising a calendar comprising the date and the display tile, wherein the display tile is positioned on the calendar at a location corresponding to the date; and displaying the calendar mosaic on a display.

53. A system for displaying a status of an object of interest comprising:

a processor in electrical communication with a memory, wherein the memory comprises computer readable non-transitory memory comprising computer readable instructions for execution by the processor that cause the system to perform the operations of receiving data related to a plurality of status attributes for an object of interest, each status attribute having an icon associated therewith conveying meaning through a pictorial resemblance of the object of interest, determining an icon display characteristic for each icon based upon the received data and indicative of a value of the associated status attribute, generating a display tile for the object of interest by combining the icons so that at least a portion of each icon with its icon display characteristic remains visible, wherein the display tile has a date associated therewith, generating a calendar mosaic comprising a calendar comprising the date and the display tile, wherein the display tile is positioned on the calendar at a location corresponding to the date, and displaying the calendar mosaic on a display.

54. A method of displaying a status of a process of interest comprising:

receiving data related to a plurality of status attributes of a process of interest, each status attribute having an icon associated therewith conveying meaning through a pictorial resemblance of the process of interest;

determining an icon display characteristic for each icon based upon the received data and indicative of a value of the associated status attribute;

generating a process display tile for the process of interest by combining the icons so that at least a portion of each icon with its icon display characteristic remains visible; and displaying the process display tile on a display.

55. The method of claim 54, wherein a portion of the icons are tab icons.

56. A system for displaying a status of a process of interest comprising:

a processor in electrical communication with a memory, wherein the memory comprises computer readable non-transitory memory comprising computer readable instructions for execution by the processor that cause the system to perform the operations of receiving data related to a plurality of status attributes of a process of interest, each status attribute having an icon associated therewith conveying meaning through a pictorial resemblance of the process of interest, determining an icon display characteristic for each icon based upon the received data and indicative of a value of the associated status attribute, generating a process display tile for the process of interest by combining the icons so that at least a portion of each icon with its icon display characteristic remains visible, and displaying the process display tile on a display.

57. The system of claim 56, wherein a portion of the icons are tab icons.

58. A method of displaying a system status for a plurality of objects of interest:

receiving data related to a plurality of status attributes for each of a plurality of objects of interest, each of the plurality of status attributes having an icon associated therewith conveying meaning through a pictorial resemblance of the object of interest;

determining an icon display characteristic for each icon based upon the received data and indicative of a value of the associated status attribute;

generating a respective display tile for each object of interest by combining the icons so that at least a portion of each icon with its icon display characteristic remains visible;

combining the display tiles in overlapped and stacked relation;

and displaying the combined display tiles on a display.

59. A system for displaying a system status for a plurality of objects of interest:

a processor in electrical communication with a memory, wherein the memory comprises computer readable non-transitory memory comprising computer readable instructions for execution by the processor that cause the system to perform the operations of receiving data related to a plurality of status attributes for each of a plurality of objects of interest, each of the plurality of status attributes having an icon associated therewith conveying meaning through a pictorial resemblance of the object of interest, determining an icon display characteristic for each icon based upon the received data and indicative of a value of the associated status attribute, generating a respective display tile for each object of interest by combining the icons so that at least a portion of each icon with its icon display characteristic remains visible, combining the display tiles in overlapped and stacked relation, and displaying the combined display tiles on a display.

60. A method of displaying a system status for a plurality of objects of interest:

receiving data related to a plurality of status attributes for each of a plurality of objects of interest, each of the plurality of status attributes having an icon associated therewith conveying meaning through a pictorial resemblance of the object of interest;

determining an icon display characteristic for each icon based upon the received data and indicative of a value of the associated status attribute;

generating a respective display tile for each object of interest by combining the icons so that at least a portion of each icon with its icon display characteristic remains visible;

combining the display tiles;

generating a composite indicator representing the combined display tiles; and displaying the composite indicator on a display.

61. A system for displaying a system status for a plurality of objects of interest:

a processor in electrical communication with a memory, wherein the memory comprises computer readable non-transitory memory comprising computer readable instructions for execution by the processor that cause the system to perform the operations of receiving data related to a plurality of status attributes for each of a plurality of objects of interest, each of the plurality of status attributes having an icon associated therewith conveying meaning through a pictorial resemblance of the object of interest, determining an icon display characteristic for each icon based upon the received data and indicative of a value of the associated status attribute, generating a respective display tile for each object of interest by combining the icons so that at least a portion of each icon with its icon display characteristic remains visible, combining the display tiles, generating a composite indicator representing the combined display tiles, and displaying the composite indicator on a display.

62. A method of displaying a status of an object of interest comprising:

receiving a set of data related to a status attribute for an object of interest, the status attribute having an icon associated therewith conveying meaning through a pictorial resemblance of the object of interest;

generating a diagram of the distribution of the set of data for the status attributes;

combining the diagram and at least one slideable manipulation slider;

displaying the combined diagram and the slideable manipulation slider on a display;

receiving input from a user comprising the placement of the manipulation slider in relation to the diagram;

determining a threshold for a first icon display characteristic and a second icon display characteristic for the icon based upon the placement of the manipulation slider;

receiving additional data related to the status attribute; and displaying at least a portion of the icon on the display, wherein the first icon display characteristic is visible on the icon when the additional data is below the threshold and the second icon display characteristic is visible on the icon when the additional data is above the threshold.

63. A system for displaying a status of an object of interest comprising:

a processor in electrical communication with a memory, wherein the memory comprises computer readable non-transitory memory comprising computer readable instructions for execution by the processor that cause the system to perform the operations of receiving a set of data related to a status attribute for an object of interest, the status attribute having an icon associated therewith conveying meaning through a pictorial resemblance of the object of interest, generating a diagram of the distribution of the set of data for the status attributes, combining the diagram and at least one slideable manipulation slider, displaying the combined diagram and the at least one slideable manipulation slider on a display, receiving input from a user comprising the placement of the manipulation slider in relation to the diagram, determining a threshold for a first icon display characteristic and a second icon display characteristic for the icon based upon the placement of the manipulation slider, receiving additional data related to the status attribute, and displaying at least a portion of the icon on the display, wherein the first icon display characteristic is visible on the icon when the additional data is below the threshold and the second icon display characteristic is visible on the icon when the additional data is above the threshold.

* * * * *